(12) United States Patent
Ohtsuka et al.

(10) Patent No.: US 7,980,645 B2
(45) Date of Patent: Jul. 19, 2011

(54) DROPLET APPLYING APPARATUS, METHOD FOR MEASURING GAP OF DROPLET EJECTING SECTION AND METHOD FOR ADJUSTING GAP OF DROPLET EJECTING SECTION

(75) Inventors: Hideshi Ohtsuka, Tenri (JP); Mitsuhiro Iwata, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 339 days.

(21) Appl. No.: 12/226,803

(22) PCT Filed: Apr. 24, 2007

(86) PCT No.: PCT/JP2007/058802
§ 371 (c)(1),
(2), (4) Date: Feb. 17, 2009

(87) PCT Pub. No.: WO2007/125893
PCT Pub. Date: Nov. 8, 2007

(65) Prior Publication Data
US 2009/0219311 A1 Sep. 3, 2009

(30) Foreign Application Priority Data
Apr. 28, 2006 (JP) .................................. 2006-125349

(51) Int. Cl.
*B41J 25/308* (2006.01)
(52) U.S. Cl. .................................. 347/8; 347/5; 347/15
(58) Field of Classification Search .................. 347/5, 8, 347/9, 12, 15, 19
See application file for complete search history.

(56) References Cited

U.S. PATENT DOCUMENTS

| 6,758,550 | B2 | 7/2004 | Ito et al. |
| 7,322,394 | B2 | 1/2008 | Nakamura et al. |
| 7,434,902 | B2 * | 10/2008 | Baker et al. ....................... 347/8 |
| 2004/0075713 | A1 | 4/2004 | Takano et al. |
| 2006/0119629 | A1 * | 6/2006 | An et al. ........................... 347/5 |

FOREIGN PATENT DOCUMENTS

| JP | 2003-084125 | 3/2003 |
| JP | 2003-127392 | 5/2003 |
| JP | 2004-130299 | 4/2004 |
| JP | 2005-031144 | 2/2005 |

* cited by examiner

*Primary Examiner* — Lam S Nguyen
(74) *Attorney, Agent, or Firm* — David G. Conlin; Steven M. Jensen; Edwards Angell Palmer & Dodge LLP

(57) ABSTRACT

A droplet applying apparatus includes a base 11 having a mounting surface 11a on which a substrate 10 is to be mounted, beam members 41, 42 which are fitted to the base 11 so as to be movable relative to the base 11 in the arrow A direction, a plurality of droplet ejecting sections 6 which are fitted to the beam members 41, 42 so as to be movable in the arrow B direction and which eject droplets to the substrate 10 mounted on the mounting surface 11a, reference members each of which is provided at a site of the beam members 41, 42 proximate to the ejecting surface of each droplet ejecting section 6 and whose distance to the mounting surface 11a is known, a distance measuring section 14 for measuring a distance to the ejecting surface of each droplet ejecting section 6 and a distance to each reference member, and a calculation section 15 for, based on a distance between the ejecting surface of the one droplet ejecting section 6 and the distance measuring section 14 as well as a distance between the one reference member and the distance measuring section 14, both measured by the distance measuring section 14, plus a known distance between the one reference member and the mounting surface 11a, calculating a gap between the ejecting surface of the one droplet ejecting section 6 and the mounting surface 11a.

6 Claims, 25 Drawing Sheets

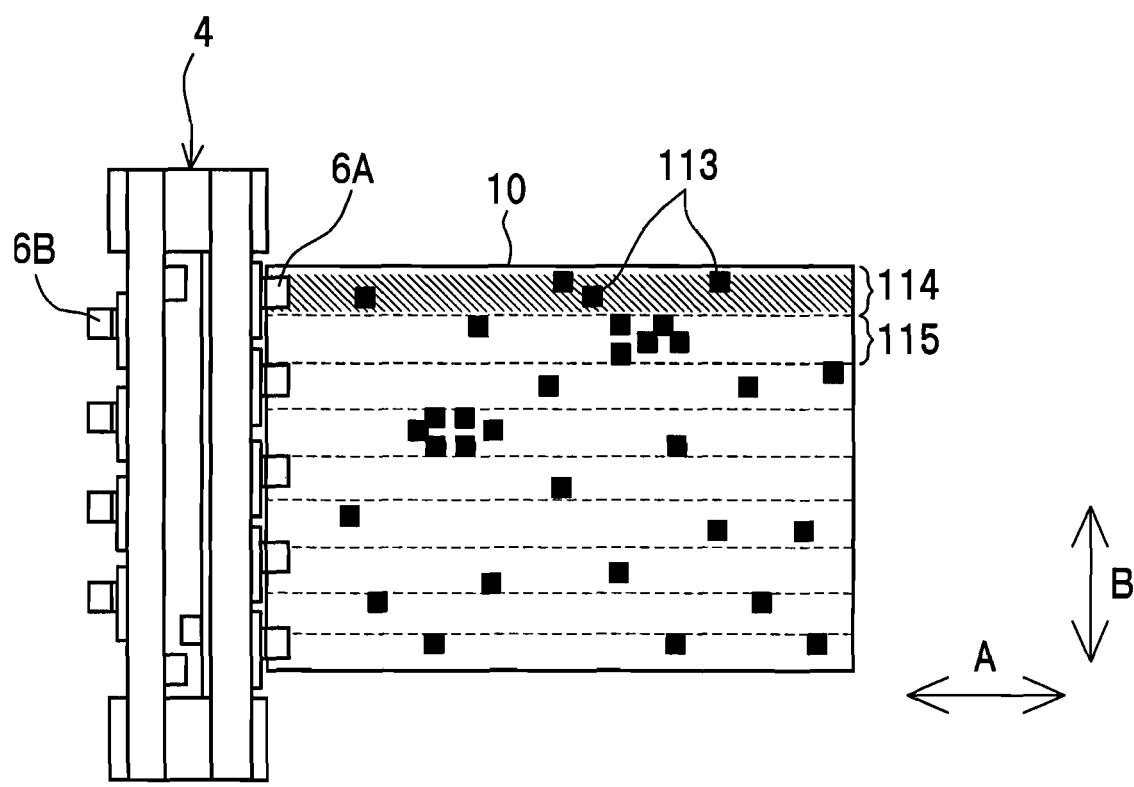

DROPLET APPLYING APPARATUS, METHOD FOR MEASURING GAP OF DROPLET EJECTING SECTION AND METHOD FOR ADJUSTING GAP OF DROPLET EJECTING SECTION

TECHNICAL FIELD

The present invention relates to a droplet applying apparatus for applying droplets onto a substrate by an ink jet system or the like, a method for measuring gaps of droplet ejecting sections of the droplet applying apparatus, and a method for adjusting gaps of droplet ejecting sections of the droplet applying apparatus.

BACKGROUND ART

In recent years, the ink jet technology has been expected for use as manufacturing apparatuses, not merely as printer devices for forming images on paper mediums. For example, in JP 2003-84125 A or JP 2003-127392 A, an apparatus construction in which droplet ejecting elements using the ink jet system are mounted is disclosed as a manufacturing apparatus for liquid crystal displays, organic EL displays and the like.

A general-use printer by the ink jet system, typically, forms images by using a droplet ejecting section as one ink jet head unit on which several pieces of ink jet head elements each having a width of ½ to 2 inches and having nozzle openings regularly arrayed at intervals of 150 to 300 nozzles/inch are mounted as elements for ejecting droplets in some plural quantity for each of the individual colors. As the method therefor, it has been practiced that recording sheet, while fed by a sheet feed roller, is scanned a plurality of times in a direction perpendicular to the carrying direction of the recording sheet so that an image is formed on the recording sheet.

Even with the use of the ink jet system as a manufacturing apparatus, the ink jet head elements are similar to those of general-purpose printers, the size of each ink jet head element in the nozzle array direction being 1 to 2 inches at most as it stands.

Meanwhile, manufacturing processes for liquid crystal displays, organic EL displays and the like are increasingly directed toward increasing the yield quantity by using larger-area substrates to reduce the cost and the cycle time. Manufacture of these devices and others by the ink jet system, it has been considered, would require an apparatus that is capable of managing large-area substrates having one side as much as several meters.

In JP 2003-84125 A or JP 2003-127392 A, a plurality of droplet ejecting sections (heads) are used to meet such large-area substrates as described above.

In another aspect, if there are variations in the distance (hereinafter, referred to as a gap of a droplet ejecting section) from each of droplet ejecting surfaces of the droplet ejecting sections to a surface of an objective substrate, then the time elapsing from ejection to landing is varied, causing the landing position to be varied. Therefore, it is necessary to adjust the gaps of the droplet ejecting sections so that all the droplet ejecting sections become generally equal in gaps. These droplet ejecting sections need replacement due to damage of the droplet ejecting surfaces, internal solid sticking or the like, which gives rise to a need for adjustment of gaps of the droplet ejecting sections on each replacement of the droplet ejecting sections.

As a method for adjusting the gaps of the droplet ejecting sections, JP 2005-31144 A discloses a technique using a distance measuring device.

In JP 2005-31144 A, one distance measuring device is used to perform the gap adjustment of droplet ejecting sections with respect to a plurality of droplet ejecting sections. In this case, the droplet ejecting sections, each having one or a plurality of ejecting elements and a housing for housing the ejecting elements therein, are fittable and removable in block.

Moving the distance measuring device between the plurality of droplet ejecting sections would cause the distance measuring device to be incorrect in height. As a method for correcting the incorrect height of the distance measuring device, JP 2005-31144 A discloses a technique that a reference surface is provided within a substrate-mounting stage to correct the height of the distance measuring device.

Also, whereas the adjustment of the gaps of the droplet ejecting sections is necessarily required after the fitting of the droplet ejecting sections, the gaps of the droplet ejecting sections are normally as narrow as about 0.5 mm. Therefore, it is necessary to make the stage escape from under the droplet ejecting sections during the time duration from the fitting of the droplet ejecting sections until the adjustment completion of the gaps of the droplet ejecting sections.

The procedure for adjustment of the gaps of the droplet ejecting sections is now explained. First, the distance measuring device is moved to under the droplet ejecting sections, and the stage is moved to under the droplet ejecting sections, in which state the correction of the distance measuring device is carried out. Thereafter, the stage is made to escape from under the droplet ejecting sections, and old droplet ejecting sections, if any, are removed and new ones are fitted, followed by executing the gap adjustment of the droplet ejecting sections.

However, with the technique disclosed in JP 2005-31144 A, the moving distance of the stage is increased with increasing size of the substrate, taking longer time for the movement of the stage. This would result in increases in the time for replacement of the droplet ejecting sections heretofore. Also, increases in the size of the substrate would lead to increases in size of the stage, causing an increase in cost as well as an increase in size of the apparatus as a whole.

With regard to the stage, if not a movable stage but a stationary stage is used, the distance measuring device, which needs to be subjected to height adjustment as it is under the droplet ejecting sections, cannot be subjected to height correction by using the stationary stage because the replacement of the droplet ejecting sections needs to be done at places away from the stationary stage.

DISCLOSURE OF THE INVENTION

Accordingly, an object of the present invention is to provide a droplet applying apparatus which is capable of determining a gap between an ejecting surface of a droplet ejecting section and a stage regardless of a position of the stage to enable a shortening of the replacement time of the droplet ejecting sections and moreover which is applicable also to stationary stages, as well as to provide a method for measuring gaps of droplet ejecting sections of the droplet applying apparatus and a method for adjusting gaps of droplet ejecting sections of the droplet applying apparatus.

In order to accomplish the above object, there is provided a droplet applying apparatus comprising:

a base having a mounting surface on which a substrate is to be mounted;

a beam member which confronts the mounting surface and extends in one direction of the mounting surface and which is fitted to the base so as to be movable relative to the base in another direction of the mounting surface;

a plurality of droplet ejecting sections which are removably fitted to the beam member and which eject and apply droplets from ejecting surfaces thereof to the substrate;

reference members each of which is provided at a site of the beam member proximate to the ejecting surface of each droplet ejecting section and whose distance to the mounting surface is known;

a distance measuring section which is fitted to the base so as to be movable relative to the beam member and which confronts the ejecting surface of each droplet ejecting section to measure a distance to the ejecting surface of the droplet ejecting section and moreover which confronts each reference member to measure a distance to the reference member; and a calculation section for, based on a distance between the ejecting surface of one of the droplet ejecting sections and the distance measuring section as well as a distance between one of the reference members proximate to the ejecting surface of the one droplet ejecting section and the distance measuring section, both measured by the distance measuring section, plus a known distance between the one reference member and the mounting surface, calculating a gap between the ejecting surface of the one droplet ejecting section and the mounting surface.

In the droplet applying apparatus of this invention, the droplet applying apparatus includes the reference members each of which is provided at a site of the beam member proximate to the ejecting surface of each droplet ejecting section and whose distance to the mounting surface is known, the distance measuring section for measuring a distance to the ejecting surface of the droplet ejecting section and a distance to the reference member, and a calculation section for, based on a distance between the ejecting surface of the one droplet ejecting section and the distance measuring section as well as a distance between the one reference member and the distance measuring section, both measured by the distance measuring section, plus the known distance between the one reference member and the mounting surface, calculating a gap between the ejecting surface of the one droplet ejecting section and the mounting surface. Therefore, the gap between the ejecting surface of the one droplet ejecting section and the mounting surface can be calculated regardless of the position of the mounting surface. Then, the gap of the droplet ejecting section (i.e., distance between the ejecting surface of the droplet ejecting section and the surface of the substrate) can be determined from the gap between the ejecting surface of the droplet ejecting section and the mounting surface as well as the thickness of the substrate. Since the thickness of the substrate is known, once determining the gap between the ejecting surface of the droplet ejecting section and the mounting surface allows the gap of the droplet ejecting section to be determined.

Accordingly, the gap between the ejecting surface of the droplet ejecting section and the mounting surface can be determined without moving the mounting surface, as would be involved in the conventional technique, so that the replacement time for the droplet ejecting section can be shortened. Also, since the droplet ejecting section does not overlap with the mounting surface (because of the location of the droplet ejecting section outer than the mounting surface) in the adjustment of the gap between the ejecting surface of the droplet ejecting section and the mounting surface, contact between the droplet ejecting section and the mounting surface can be prevented, so that the height of the ejecting surface of the droplet ejecting section can be adjusted with safety. Moreover, even with the mounting surface fixed (i.e., stationary stage), the height of the ejecting surface of the droplet ejecting section can be adjusted, so that the apparatus can be made smaller-sized and lower-priced.

One embodiment further comprises the droplet applying apparatus as claimed in Claim 1, further comprising an adjustment member for moving the ejecting surface of each of the droplet ejecting sections closer to or farther from the mounting surface to adjust a gap between the ejecting surface of the droplet ejecting section and the mounting surface.

In the droplet applying apparatus of this embodiment, the droplet applying apparatus includes an adjustment member for moving the ejecting surface of each of the droplet ejecting sections closer to or farther from the mounting surface to adjust a gap between the ejecting surface of the droplet ejecting section and the mounting surface. Therefore, the gap between the ejecting surface of each droplet ejecting section and the mounting surface can be adjusted with reliability.

In one embodiment, the distance measuring section does not overlap with the mounting surface and is positioned on one side of opposite to a side of the mounting surface on which the beam member and the droplet ejecting sections are provided.

In the droplet applying apparatus of this embodiment, the distance measuring section does not overlap with the mounting surface, and is positioned on one side of the mounting surface opposite to the side on which the beam members and the droplet ejecting sections are provided. Therefore, the distance measuring section can be set in a wide space, not in a narrow space between the mounting surface, the beam member and the droplet ejecting sections. Thus, the distance measuring section can be set up easily without problem.

In one embodiment, the beam member comprises:

a beam member body; and slide mechanisms which are fitted to the beam member body and to which the droplet ejecting sections are fitted, respectively, so as to be movable relative to the beam member body, wherein the reference members are provided on the slide mechanisms, respectively.

In the droplet applying apparatus of this embodiment, the reference members are provided on the slide mechanisms. Therefore, the distance between the ejecting surface of each droplet ejecting section and the reference member can be shortened, making it possible to reduce relative errors of the distance between the ejecting surface of each droplet ejecting section and the distance measuring section as well as the distance between the reference member and the distance measuring section. Thus, the gap between the ejecting surface of the droplet ejecting section and the mounting surface can be correctly calculated.

According to one aspect of the present invention, there is provided a method for measuring a gap between an ejecting surface of each of droplet ejecting sections and a mounting surface in a droplet applying apparatus, wherein the droplet applying apparatus comprises:

a base having the mounting surface on which a substrate is to be mounted;

a beam member which confronts the mounting surface and extends in one direction of the mounting surface and which is fitted to the base so as to be movable relative to the base in another direction of the mounting surface; and a plurality of the droplet ejecting sections which are removably fitted to the beam member and which eject and apply droplets from ejecting surfaces thereof to the substrate, the method comprising the steps of:

setting a distance measuring section, which is fitted to the base so as to be movable relative to the beam member, opposed to an ejecting surface of one of the droplet ejecting sections to measure a distance to the ejecting surface of the one droplet ejecting section;

setting the distance measuring section opposed to one reference member proximate to the ejecting surface of the one droplet ejecting section out of reference members each of which is provided at a site of the beam member proximate to the ejecting surface of the droplet ejecting section and whose distance to the mounting surface is known, to measure a distance to the one reference member;

based on a distance between the ejecting surface of the one droplet ejecting section and the distance measuring section as well as a distance between the one reference member and the distance measuring section, both measured by the distance measuring section, plus a known distance between the one reference member and the mounting surface, calculating a gap between the ejecting surface of the one droplet ejecting section and the mounting surface by a calculation section.

In this method for measuring gaps of the droplet ejecting sections, the method includes the step of measuring a distance to the ejecting surface of the one droplet ejecting section by the distance measuring section, the step of measuring a distance to the one reference member by the distance measuring section, the step of, based on the distance between the ejecting surface of the one droplet ejecting section and the distance measuring section as well as the distance between the one reference member and the distance measuring section, both measured by the distance measuring section, plus the known distance between the one reference member and the mounting surface, calculating a gap between the ejecting surface of the one droplet ejecting section and the mounting surface by the calculation section. Therefore, the gap between the ejecting surface of the one droplet ejecting section and the mounting surface can be calculated regardless of the position of the mounting surface. Then, the gap of the droplet ejecting section (i.e., distance between the ejecting surface of the droplet ejecting section and the surface of the substrate) can be determined from the gap between the ejecting surface of the droplet ejecting section and the mounting surface as well as the thickness of the substrate. Since the thickness of the substrate is known, once determining the gap between the ejecting surface of the droplet ejecting section and the mounting surface allows the gap of the droplet ejecting section to be determined.

Accordingly, the gap between the ejecting surface of the droplet ejecting section and the mounting surface can be determined without moving the mounting surface, as would be involved in the conventional technique, so that the replacement time for the droplet ejecting section can be shortened. Also, since the droplet ejecting section does not overlap with the mounting surface in the adjustment of the gap between the ejecting surface of the droplet ejecting section and the mounting surface, contact between the droplet ejecting section and the mounting surface can be prevented, so that the height of the ejecting surface of the droplet ejecting section can be adjusted with safety. Moreover, even with the mounting surface fixed (i.e., stationary stage), the height of the ejecting surface of the droplet ejecting section can be adjusted, so that the apparatus can be made smaller-sized and lower-priced.

According to another aspect of the present invention, there is provided a method for adjusting a gap between an ejecting surface of each of droplet ejecting sections and a mounting surface in a droplet applying apparatus, wherein the droplet applying apparatus comprises:

a base having the mounting surface on which a substrate is to be mounted;

a beam member which confronts the mounting surface and extends in one direction of the mounting surface and which is fitted to the base so as to be movable relative to the base in another direction of the mounting surface; and a plurality of the droplet ejecting sections which are removably fitted to the beam member and which eject and apply droplets from ejecting surfaces thereof to the substrate, the method comprising the steps of:

setting a distance measuring section, which is fitted to the base so as to be movable relative to the beam member, opposed to an ejecting surface of one of the droplet ejecting sections to measure a distance to the ejecting surface of the one droplet ejecting section;

setting the distance measuring section opposed to one reference member proximate to the ejecting surface of the one droplet ejecting section out of reference members each of which is provided at a site of the beam member proximate to the ejecting surface of the droplet ejecting section and whose distance to the mounting surface is known, to measure a distance to the one reference member;

based on a distance between the ejecting surface of the one droplet ejecting section and the distance measuring section as well as a distance between the one reference member and the distance measuring section, both measured by the distance measuring section, plus a known distance between the one reference member and the mounting surface, calculating a gap between the ejecting surface of the one droplet ejecting section and the mounting surface by a calculation section; and moving the ejecting surface of the one droplet ejecting section closer to or farther from the mounting surface so that the gap between the ejecting surface of the one droplet ejecting section and the mounting surface calculated by the calculation section becomes a specified quantity.

In this method for adjusting gaps of droplet ejecting sections, the method includes the step of measuring a distance to the ejecting surface of the one droplet ejecting section by the distance measuring section, the step of measuring a distance to the one reference member by the distance measuring section, the step of, based on the distance between the ejecting surface of the one droplet ejecting section and the distance measuring section as well as the distance between the one reference member and the distance measuring section, both measured by the distance measuring section, plus the known distance between the one reference member and the mounting surface, calculating a gap between the ejecting surface of the one droplet ejecting section and the mounting surface by the calculation section, and the step of moving the ejecting surface of the one droplet ejecting section closer to or farther from the mounting surface so that the gap between the ejecting surface of the one droplet ejecting section and the mounting surface calculated by the calculation section becomes a specified quantity. Therefore, the gap between the ejecting surface of the one droplet ejecting section and the mounting surface can be calculated regardless of the position of the mounting surface. Then, the gap of the droplet ejecting section (i.e., distance between the ejecting surface of the droplet ejecting section and the surface of the substrate) can be determined from the gap between the ejecting surface of the droplet ejecting section and the mounting surface as well as the thickness of the substrate. Since the thickness of the substrate is known, once determining the gap between the ejecting surface of the droplet ejecting section and the mounting surface allows the gap of the droplet ejecting section to be determined.

Accordingly, the gap between the ejecting surface of the droplet ejecting section and the mounting surface can be determined without moving the mounting surface, as would be involved in the conventional technique, so that the replacement time for the droplet ejecting section can be shortened. Also, since the droplet ejecting section does not overlap with the mounting surface in the adjustment of the gap between the ejecting surface of the droplet ejecting section and the mounting surface, contact between the droplet ejecting section and the mounting surface can be prevented, so that the height of the ejecting surface of the droplet ejecting section can be adjusted with safety. Moreover, even with the mounting surface fixed (i.e., stationary stage), the height of the ejecting surface of the droplet ejecting section can be adjusted, so that the apparatus can be made smaller-sized and lower-priced.

According to the droplet applying apparatus of the present invention, the droplet applying apparatus includes the reference members each of which is provided at a site of the beam member proximate to the ejecting surface of each droplet ejecting section and whose distance to the mounting surface is known, the distance measuring section for measuring a distance to the ejecting surface of the droplet ejecting section and a distance to the reference member, and a calculation section for, based on a distance between the ejecting surface of the one droplet ejecting section and the distance measuring section as well as a distance between the one reference member and the distance measuring section, both measured by the distance measuring section, plus the known distance between the one reference member and the mounting surface, calculating a gap between the ejecting surface of the one droplet ejecting section and the mounting surface. Therefore, the gap between the ejecting surface of the droplet ejecting section and the mounting surface can be determined regardless of the position of the mounting surface. Thus, the replacement time for the droplet ejecting section can be shortened and the apparatus becomes applicable also to cases in which the mounting surface is fixed.

Also, according to the method for measuring gaps of the droplet ejecting sections in the invention, the method includes the step of measuring a distance to the ejecting surface of the one droplet ejecting section by the distance measuring section, the step of measuring a distance to the one reference member by the distance measuring section, the step of, based on the distance between the ejecting surface of the one droplet ejecting section and the distance measuring section as well as the distance between the one reference member and the distance measuring section, both measured by the distance measuring section, plus the known distance between the one reference member and the mounting surface, calculating a gap between the ejecting surface of the one droplet ejecting section and the mounting surface by the calculation section. Therefore, the gap between the ejecting surface of the droplet ejecting section and the mounting surface can be determined regardless of the position of the mounting surface. Thus, the replacement time for the droplet ejecting section can be shortened and the apparatus becomes applicable also to cases in which the mounting surface is fixed.

Also, according to the method for adjusting gaps of droplet ejecting sections in the invention, the method includes the step of measuring a distance to the ejecting surface of the one droplet ejecting section by the distance measuring section, the step of measuring a distance to the one reference member by the distance measuring section, the step of, based on the distance between the ejecting surface of the one droplet ejecting section and the distance measuring section as well as the distance between the one reference member and the distance measuring section, both measured by the distance measuring section, plus the known distance between the one reference member and the mounting surface, calculating a gap between the ejecting surface of the one droplet ejecting section and the mounting surface by the calculation section, and the step of moving the ejecting surface of the one droplet ejecting section closer to or farther from the mounting surface so that the gap between the ejecting surface of the one droplet ejecting section and the mounting surface calculated by the calculation section becomes a specified quantity. Therefore, the gap between the ejecting surface of the droplet ejecting section and the mounting surface can be determined regardless of the position of the mounting surface. Thus, the replacement time for the droplet ejecting section can be shortened and the apparatus becomes applicable also to cases in which the mounting surface is fixed.

BRIEF DESCRIPTION OF THE DRAWINGS

FIG. 8C is a function explanatory view showing a state that the substrate is carried in;

FIG. 17 is a function explanatory view showing an operation that droplets are ejected to the substrate by droplet ejecting sections;

DETAILED DESCRIPTION OF THE INVENTION

Hereinbelow, the present invention will be described in detail by embodiments thereof illustrated in accompanying drawings.

Figure 1A:
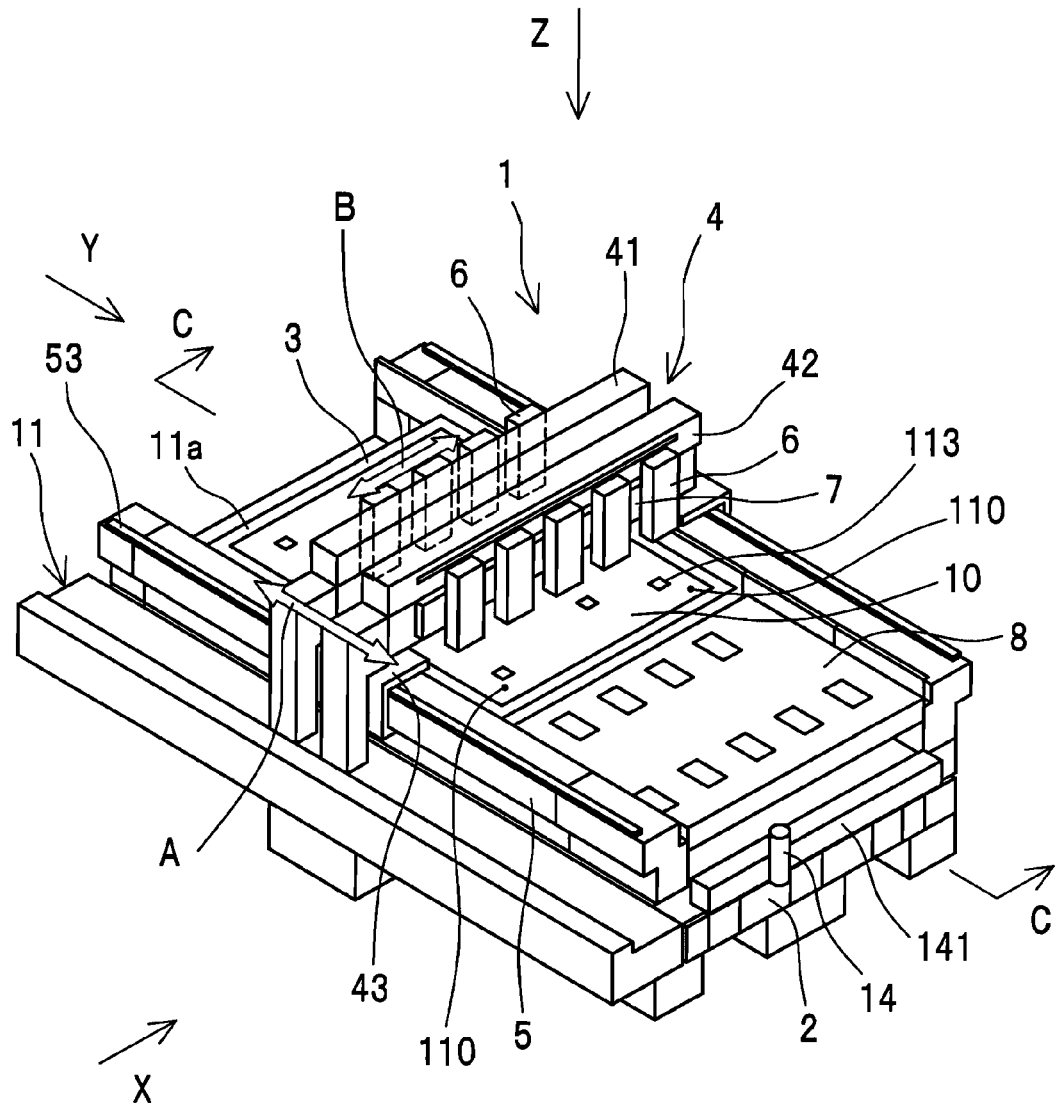
FIG. 1A is a perspective view showing an embodiment of a droplet applying apparatus of the present invention.
Figure 1B:
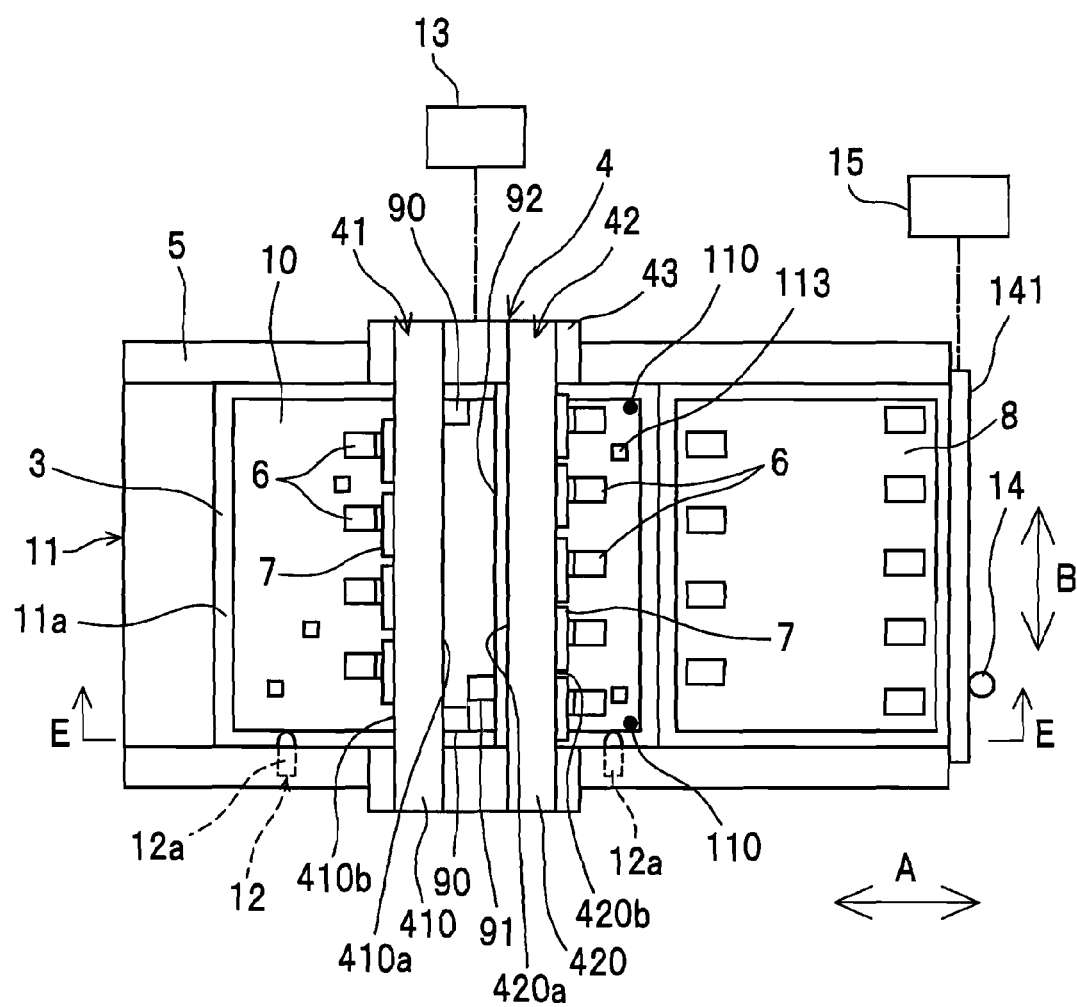
FIG. 1B is a plan view of the droplet applying apparatus.

FIGS. 1A and 1B are constructional views showing an embodiment of a droplet applying apparatus of the invention. The droplet applying apparatus 1 of the invention includes: a base 11 having a mounting surface 11a on which a substrate 10 is to be mounted; an arm part 4 which is fitted to the base 11 so as to be movable relative to the base 11; and a plurality of droplet ejecting sections 6 which are movably fitted to the arm part 4 and which eject droplets to the substrate 10 mounted on the mounting surface 11a.

The substrate 10 is, for example, a color filter substrate to be used for liquid crystal displays or the like. The substrate 10 has defect portions 113 such as coloring failures. Two alignment marks 110 are formed near end faces of the substrate 10. The alignment marks 110 have only to be at least two in quantity.

The base 11 has a base body 2, and a mounting stage 3 which is mounted on the base body 2 and which moves in the carry-in and carrying of the substrate 10. That is, a top surface of the mounting stage 3 includes the mounting surface 11a.

The arm part 4, which is so set as to confront and stretch over the mounting surface 11a in one direction of the mounting surface 11a, is reciprocatively movable in the other direction of the mounting surface 11a. The one direction and the other direction are perpendicular to each other. The one direction refers to an arrow B direction, and the other direction refers to an arrow A direction.

In short, the arm part 4, which is a so-called gantry, is formed into an arch shape so as to cross the mounting stage 3 sideways. The arm part 4 can be reciprocatively moved in the arrow A direction by arm part moving mechanisms 5 provided on the base body 2.

More specifically, on the base body 2, the arm part moving mechanisms 5 extending in the arrow A direction are provided on both sides of the mounting stage 3 in the arrow B direction, respectively. The arm part 4 has levitative moving mechanisms 43 fitted to the arm part moving mechanisms 5, respectively, and a first beam member 41 and a second beam member 42 stretched over the two levitative moving mechanisms 43, 43, respectively.

The first beam member 41 and the second beam member 42 extend in the arrow B direction and confront the mounting surface 11a, being arrayed in the arrow A direction side by side so as to be spaced from each other.

The droplet ejecting sections 6 are removably fitted to the first beam member 41 and the second beam member 42 so as to be movable in the arrow B direction relative to the base 11.

The first beam member 41 has a beam member body 410, and slide mechanisms 7 which are fitted to the beam member body 410 and to which the droplet ejecting sections 6 are fitted so as to be movable in the arrow B direction relative to the beam member body 410.

Similarly, the second beam member 42 has a beam member body 420, and slide mechanisms 7 which are fitted to the beam member body 420 and to which the droplet ejecting sections 6 are fitted so as to be movable in the arrow B direction relative to the beam member body 420.

The first beam member body 410 and the second beam member body 420 each have two flat surfaces which extend in the arrow B direction and which face toward mutually opposite sides in the arrow A direction. Then, the slide mechanisms 7 are mounted on one flat surface (fitting surface 410b) of the first beam member body 410 opposite to its flat surface (confronting surface 410a) confronting the second beam member body 420, as well as on one flat surface (fitting surface 420b) of the second beam member body 420 opposite to its flat surface (confronting surface 420a) confronting the first beam member body 410. The droplet ejecting sections 6 mounted on the slide mechanisms 7 are movable within movable ranges on the slide mechanisms 7, respectively, in the arrow B direction. The droplet ejecting sections 6 eject and apply droplets to specified portions of the substrate 10 such as the defect portions 113.

Four droplet ejecting sections 6 are mounted on the fitting surface 410b of the first beam member body 410, and five droplet ejecting sections 6 are mounted on the fitting surface 420b of the second beam member body 420, where totally nine droplet ejecting sections 6 are fitted to the slide mechanisms 7 independently of one another. Then, all of the droplet ejecting sections 6 move in the arrow B direction, independently of one another, on their respective slide mechanisms 7 based on control commands from the apparatus.

Each of the droplet ejecting sections 6, which has an ejecting surface with an opening formed therein for ejection of droplets, the ejecting surface being a surface generally parallel and closest to the mounting surface 11a, drops droplets from the ejecting surface to the substrate 10 on the mounting surface 11a based on a control command from the apparatus.

Further provided are image pickup parts 90 as image pickup devices which are placed between the first beam member 41 and the second beam member 42 and which are fitted to the first beam member 41, as well as an observation camera 91 as an image pickup device which is fitted to the second beam member 42.

Each of the image pickup parts 90 picks up an image of the substrate 10 for adjustment of the attitude of the substrate 10 on the mounting surface 11a. The image pickup parts 90, each having a low-magnification mode and a high-magnification mode, detect alignment marks 110 of the substrate 10 mounted on the mounting surface 11a. The image pickup parts 90 are fitted on the confronting surface 410a of the first beam member body 410 at both end portions of the first beam member 41 in the arrow B direction, respectively.

The observation camera 91 picks up an image of the substrate 10 for correction of landing positions onto the substrate 10, or picks up an image of the substrate 10 for observation of landing state on the substrate 10. The observation camera 91 is fitted on the confronting surface 420a of the second beam member body 420.

An attitude adjustment member 12 is provided on the base 11. The attitude adjustment member 12 adjusts the attitude of the substrate 10 mounted on the mounting surface 11a based on a detection result of the image pickup parts 90.

The attitude adjustment member 12 presses different two points on one end face of the substrate 10, as well as one point on the other end face of the substrate 10 perpendicular to its one end face, to thereby adjust the attitude of the substrate. That is, the attitude adjustment member 12 has pins 12a, 12a for pressing one end face of the substrate 10, and a pin (not shown) for pressing the other end face of the substrate 10.

A control section 13 for controlling movement of the arm part 4 is connected to the arm part 4. When the substrate 10 is mounted on the mounting surface 11a, the control section 13 moves the arm part 4 to move the image pickup parts 90 to specified positions relative to the mounting surface 11a and keep the image pickup parts 90 in a standby state. It is noted that the specified positions refer to, for example, positions for detecting the alignment marks 110 of the substrate 10.

On the base body 2, a maintenance mechanism 8 is provided in adjacency to the mounting stage 3. The maintenance mechanism 8 has a mechanism for capping the droplet ejecting sections 6 at their ejecting surfaces in a non-use mode, a mechanism for detecting failure ejection openings, a mechanism for recovering failure ejection openings, and the like. Then, in maintenance operation, the arm part 4 is moved to immediately above the maintenance mechanism 8 by the arm part moving mechanisms 5, so that various types of maintenance operations are performed on the droplet ejecting sections 6 by the maintenance mechanism 8.

Figure 4:
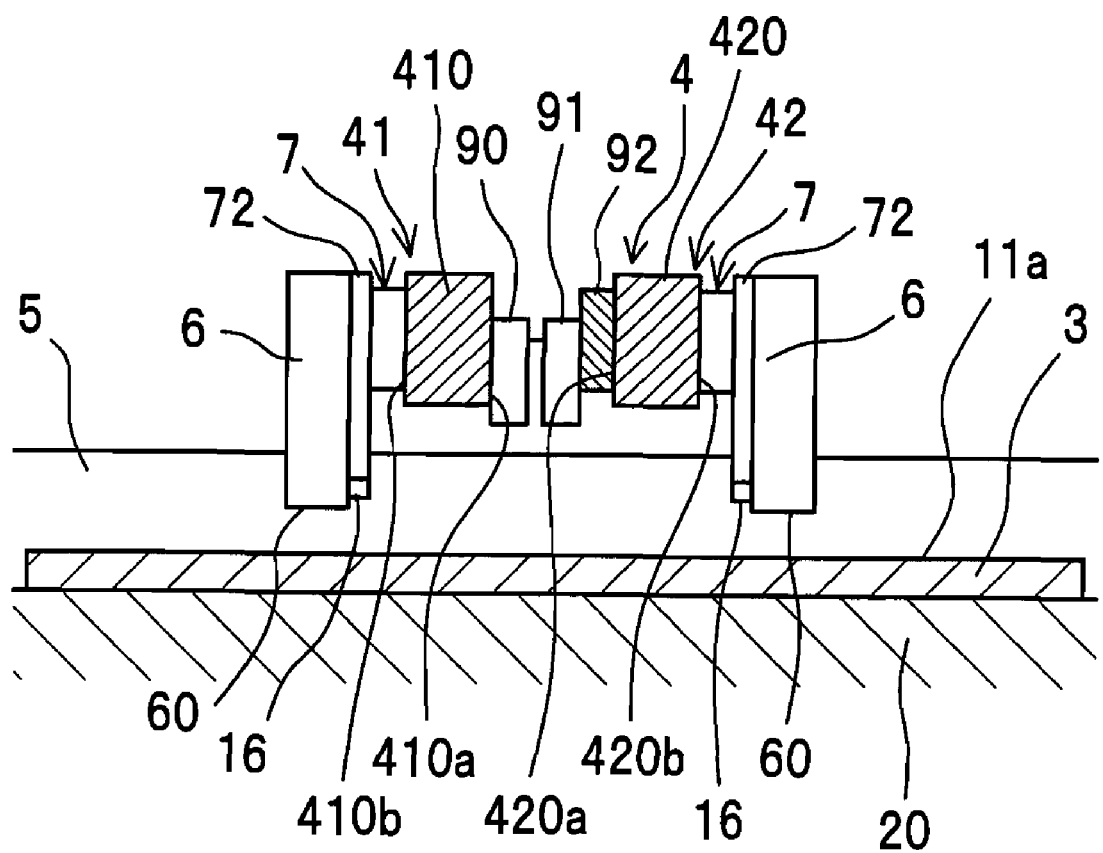
FIG. 4 is a sectional view taken along a line E-E of FIG. 1B.

As shown in FIGS. 1A, 1B and 4, a reference member 16 is provided at a site of the first beam member 41 near an ejecting surface 60 of each droplet ejecting section 6. A distance between the reference member 16 and the mounting surface 11a is known.

A distance measuring section 14 is fitted to the base 11 so as to be movable in the arrow B direction relative to the first beam member 41 and the second beam member 42.

That is, a distance-measuring-section moving mechanism 141 is fitted to the base body 2 so as to be located outer than the maintenance mechanism 8 in the arrow A direction, and the distance measuring section 14 is fitted to the distance-measuring-section moving mechanism 141 so as to be movable in the arrow B direction.

The distance measuring section 14, not overlapping with the mounting surface 11a, is positioned on one side of the mounting surface 11a opposite to the side on which the first beam member 41, the second beam member 42 and the droplet ejecting sections 6 are provided.

Then, along with movement of the arm part 4, the ejecting surface 60 of the droplet ejecting section 6 and the reference member 16 are moved onto the distance measuring section 14. That is, although not shown, a movable range of the arm part 4 by the arm part moving mechanisms 5 is large enough to make the arm part 4 moved onto the distance measuring section 14.

Thus, with the distance measuring section 14 opposed to the ejecting surface 60 of each droplet ejecting section 6, a distance between the ejecting surface 60 of the droplet ejecting section 6 and the distance measuring section 14 is measured, while with the distance measuring section 14 opposed to the reference member 16, a distance between the reference member 16 and the distance measuring section 14 is measured.

The distance-measuring-section moving mechanism 141 does not need to be high in precision. This makes it possible to use a low-priced, lightweight, space-saving moving mechanism as the distance-measuring-section moving mechanism 141. The distance-measuring-section moving mechanism 141, if sized 2500 mm as an example, has a height difference of about 0.5 mm.

The distance measuring section 14 may be implemented by using, for example, laser displacement sensor head LK-85 and amplifier unit LK-2110 made by Keyence Corporation.

A calculation section 15 is electrically connected to the distance measuring section 14. Based on a distance between the ejecting surface 60 of one of the droplet ejecting sections 6 and the distance measuring section 14 as well as a distance between one of the reference members 16 proximate to the ejecting surface 60 of the one droplet ejecting section 6 and the distance measuring section 14, both measured by the distance measuring section 14, plus a known distance between the one reference member 16 and the mounting surface 11a, the calculation section 15 calculates a gap between the ejecting surface 60 of the one droplet ejecting section 6 and the mounting surface 11a.

Figure 2:
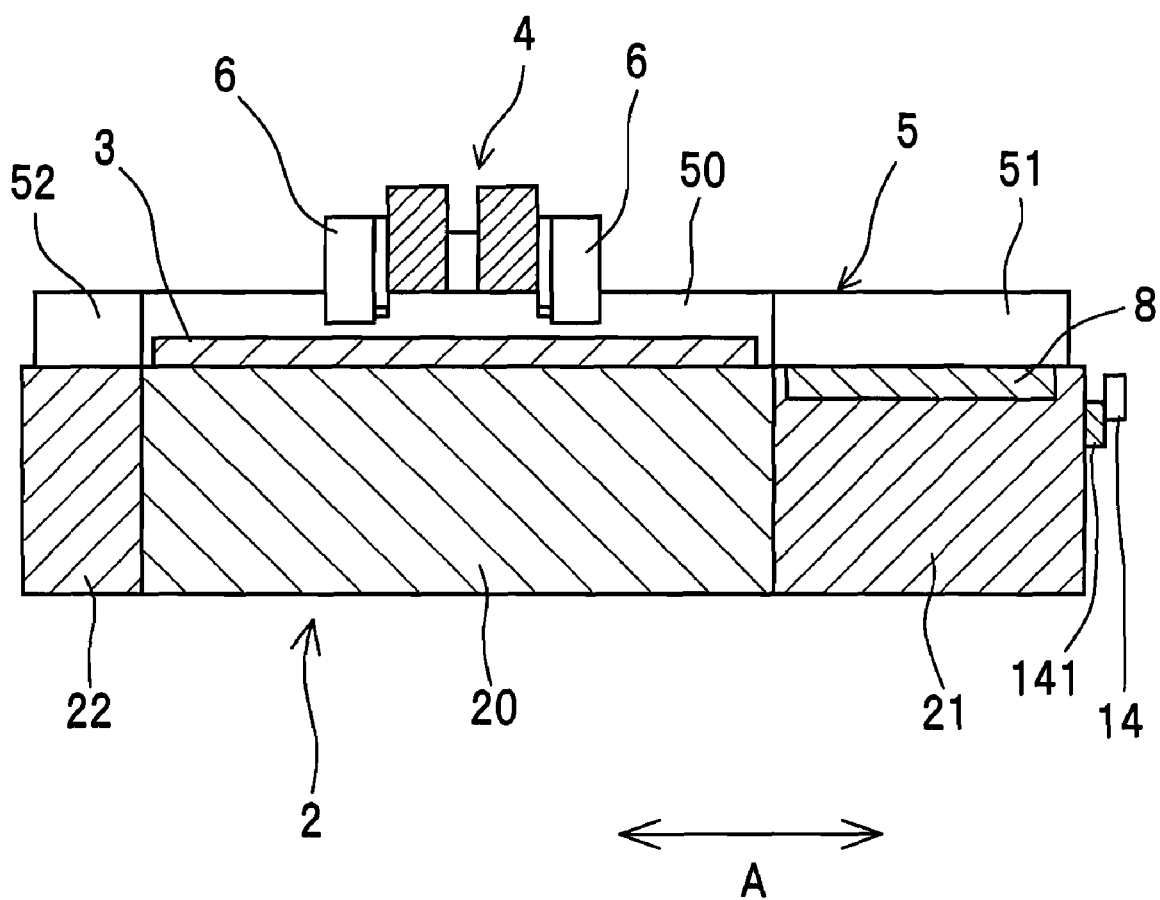
FIG. 2 is a sectional view taken along a line C-C of FIG. 1A.

As shown in FIG. 2, the base body 2 has a main stage 20 positioned in a center, and a first sub-stage 21 and a second sub-stage 22 positioned on both sides of the main stage 20 in the arrow A direction, respectively. It is noted that FIG. 2 is depicted with the substrate 10 omitted.

The first sub-stage 21 has the maintenance mechanism 8. The main stage 20, the first sub-stage 21 and the second sub-stage 22 are mechanically connected to one another.

The main stage 20, which is a high-precision stage made of granite, keeps the mounting stage 3 correctly fixed while droplets are being ejected from the droplet ejecting sections 6 toward the substrate 10 on the mounting stage 3.

The first sub-stage 21, on which the maintenance mechanism 8 is mounted, does not need to be manufactured at high precision, compared with the main stage 20.

The second sub-stage 22 is a stage to be used to move the mounting stage 3 to one end portion of the apparatus when the substrate 10 is carried in onto the mounting stage 3, or when the substrate 10 is carried out from on the mounting stage 3.

A main moving mechanism 50, a first sub-moving mechanism 51 and a second sub-moving mechanism 52 are mounted on the individual stages 20, 21, 22, respectively. The moving mechanisms 50, 51, 52 are connected to one another, with joints included therein, so that the arm part 4 is enabled to freely move over the moving mechanisms 50, 51, 52.

As shown in FIGS. 1A and 1B, the arm part 4 keeps normally air-levitated against the arm part moving mechanisms 5. That is, the arm part 4 is made movable by linear motor control between magnet type linear scales 53 provided on the arm part moving mechanisms 5 and the levitative moving mechanisms 43 of the arm part 4.

It is noted that the arm part 4 is moved to an arbitrary position in the arrow A direction by the control section 13. The height precision of the arm part moving mechanisms 5 is quite high such that variations of the distance from the ejecting surfaces 60 of the droplet ejecting sections 6 to the mounting surface 11a are no more than 10 μm for a 2500 mm move.

Then, the arm part moving mechanisms 5 and the magnet type linear scales 53 are continuously constructed, respectively, so as to be enabled to freely move over the three stages 20, 21, 22. It is noted that an unshown common vibration isolator is provided below the base body 2.

A plurality of unshown minute holes are formed in the top surface of the mounting stage 3. All of these holes are connected to an unshown suction mechanism, and the substrate 10 is sucked and fixed onto the mounting stage 3 by suction control with that suction mechanism, while the substrate 10 is released from on the mounting stage 3 by release control with the suction mechanism. The top surface of the mounting stage 3 is made of a granite surface plate having good flatness, being parallel to the ejecting surfaces of the droplet ejecting sections 6.

Figure 3:
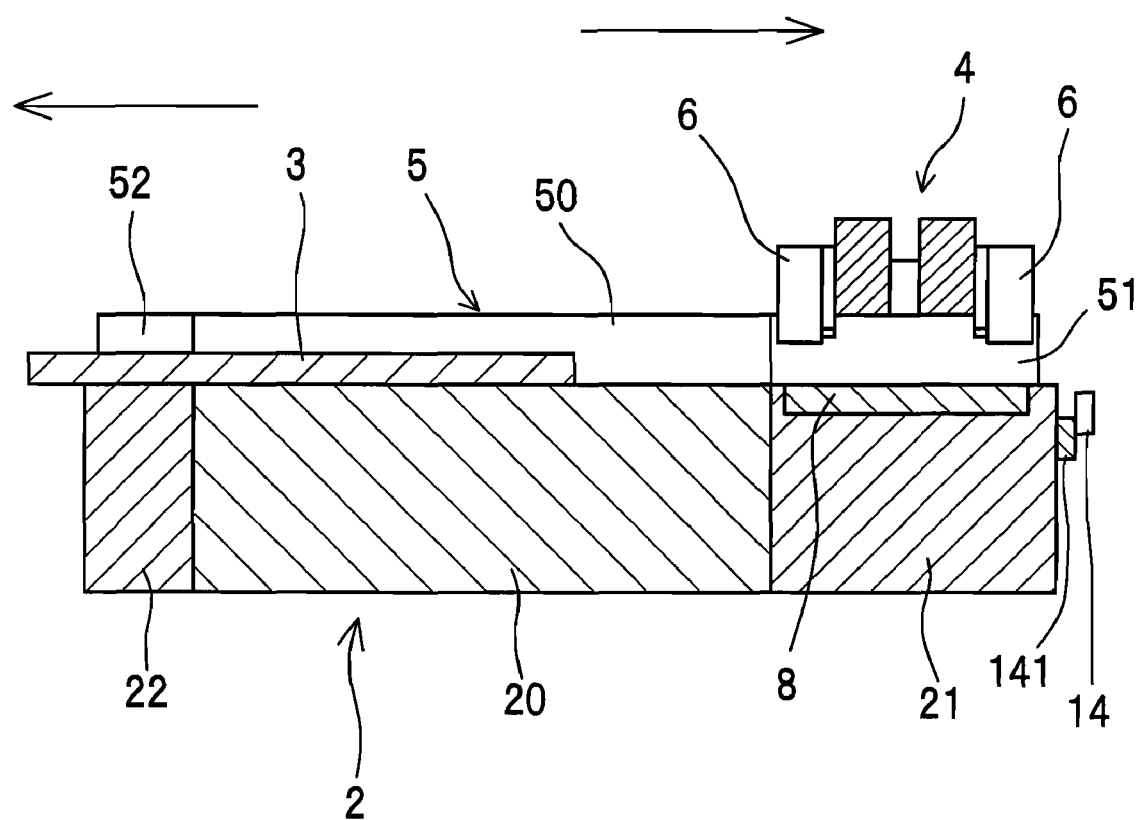
FIG. 3 is a function explanatory view of the droplet applying apparatus during carry-in or -out of a substrate.

The mounting stage 3, which is movable in the arrow A direction on unshown slide rails provided on the base body 2 by linear motor control, moves to an end portion farther from the maintenance mechanism 8 as shown in FIG. 3 when the substrate 10 is carried in or out. It is noted that the arm part 4 moves to just above the maintenance mechanism 8 when the substrate 10 is carried in or out.

As shown in FIGS. 1B and 4, four sets of the droplet ejecting section 6 and the slide mechanism 7 are fitted on the fitting surface 410b of the first beam member body 410. The two image pickup parts 90 are fitted on the confronting surface 410a of the first beam member body 410.

Five sets of the droplet ejecting section 6 and the slide mechanism 7 are fitted on the fitting surface 420b of the second beam member body 420. A slide mechanism 92 having a width generally equal to the B-direction width of the mounting stage 3 is fitted on the confronting surface 420a of the second beam member body 420. The observation camera 91 is movably fitted on the slide mechanism 92, the observation camera 91 being movable in the arrow B direction.

All of the slide mechanisms 7 are staggered in the arrow B direction as viewed from the top surface of the mounting stage 3. With regard to two slide mechanisms 7, 7 adjacent to each other in the arrow A direction, slidable areas of the two slide mechanisms 7, 7 partly overlap with each other with respect to the arrow B direction. The larger overlapping movable area is more preferable, desirably the overlapping ratio being one third or more.

Figure 5:
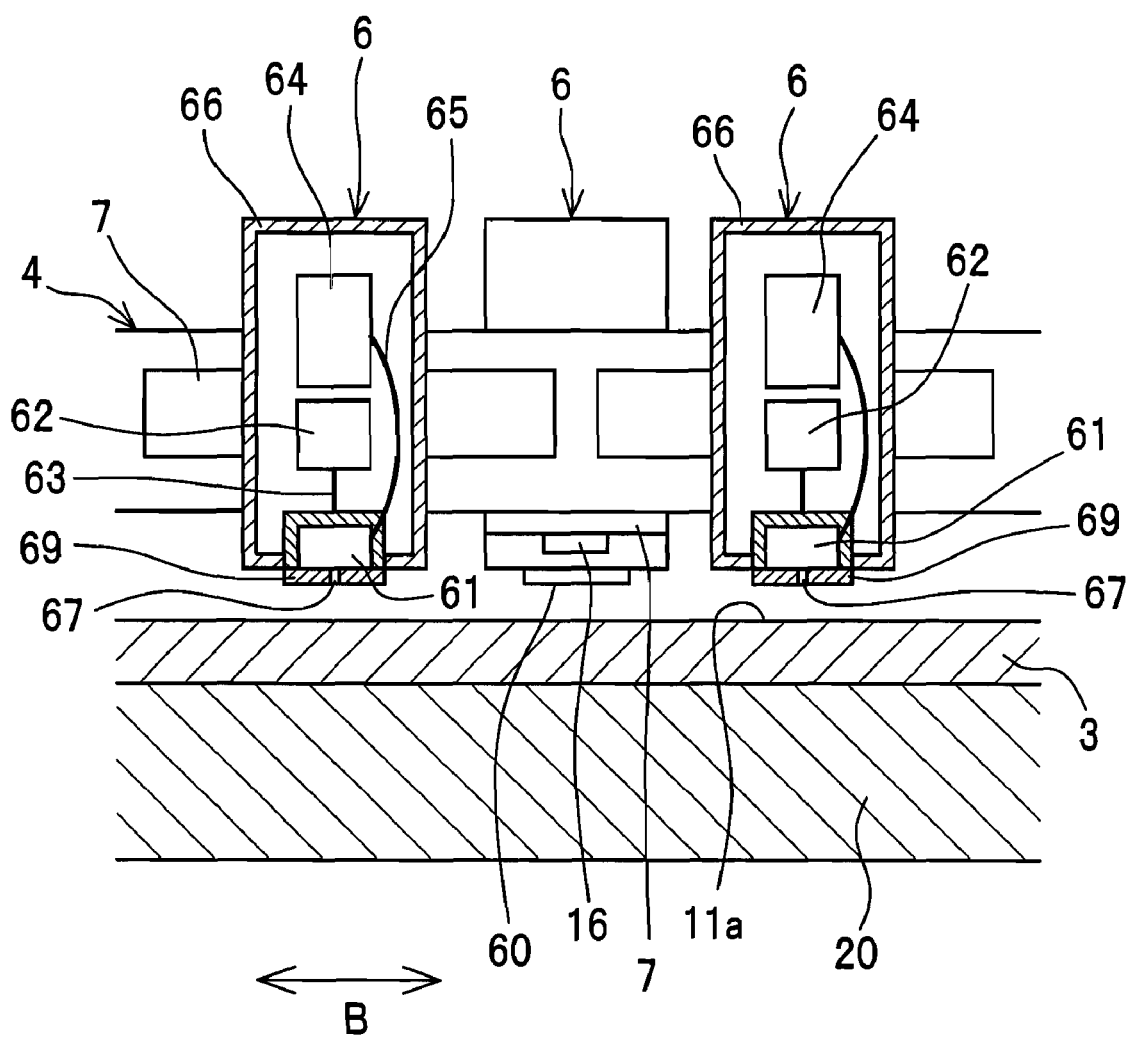
FIG. 5 is a partial sectional view as viewed in Y direction of FIG. 1A.

As shown in FIG. 5, the droplet ejecting sections 6, which are mounted on the slide mechanisms 7 set on the arm part 4, are movable in the arrow B direction independently of one another.

Each of the droplet ejecting sections 6 has a box frame 66, an ejecting element 61 housed in the box frame 66, a drive control circuit 62, an electric connection cable 63, an ink tank 64 and an ink tube 65. The box frame 66 moves on the slide mechanism 7.

A nozzle plate 69 is bonded to a surface of the ejecting element 61 parallel to the top surface of the mounting stage 3, and a plurality of nozzle openings 67 are formed in the nozzle plate 69. The diameter of each nozzle opening 67 is 10 μm to 20 μm.

The ejecting element 61 is such a common one that, for example, after recesses as a plurality of ink chambers are formed in a piezoelectric-material substrate, electrodes are formed at part of partition-wall side faces, in which arrangement an electric field is applied to between both side faces of the partition wall so that the partition wall itself is shear-deformed to generate ejection energy.

The drive control circuit 62 is connected to an unshown drive control system by an unshown cable to exert ejection control.

The droplet ejecting section 6 contains an (unshown) adjustment member for adjusting the height of the ejecting element 61, so that the distance between the ejecting surface 60 of the droplet ejecting section 6 and the substrate on the mounting surface 11a can be adjusted by the adjustment member. This distance is adjusted so as to fall within a range of 0.5 to 1.0 mm.

The adjustment member may be provided by using an automatic uniaxial stage, in which case the adjustment can be carried out fully automatically.

The adjustment member may also be given by a manual uniaxial stage, in which case the stage may be a small-size, lightweight stage, making it possible to reduce the weight of the droplet ejecting sections 6. Accordingly, it also becomes achievable to reduce the weight of the whole arm part 4.

Figure 6A:
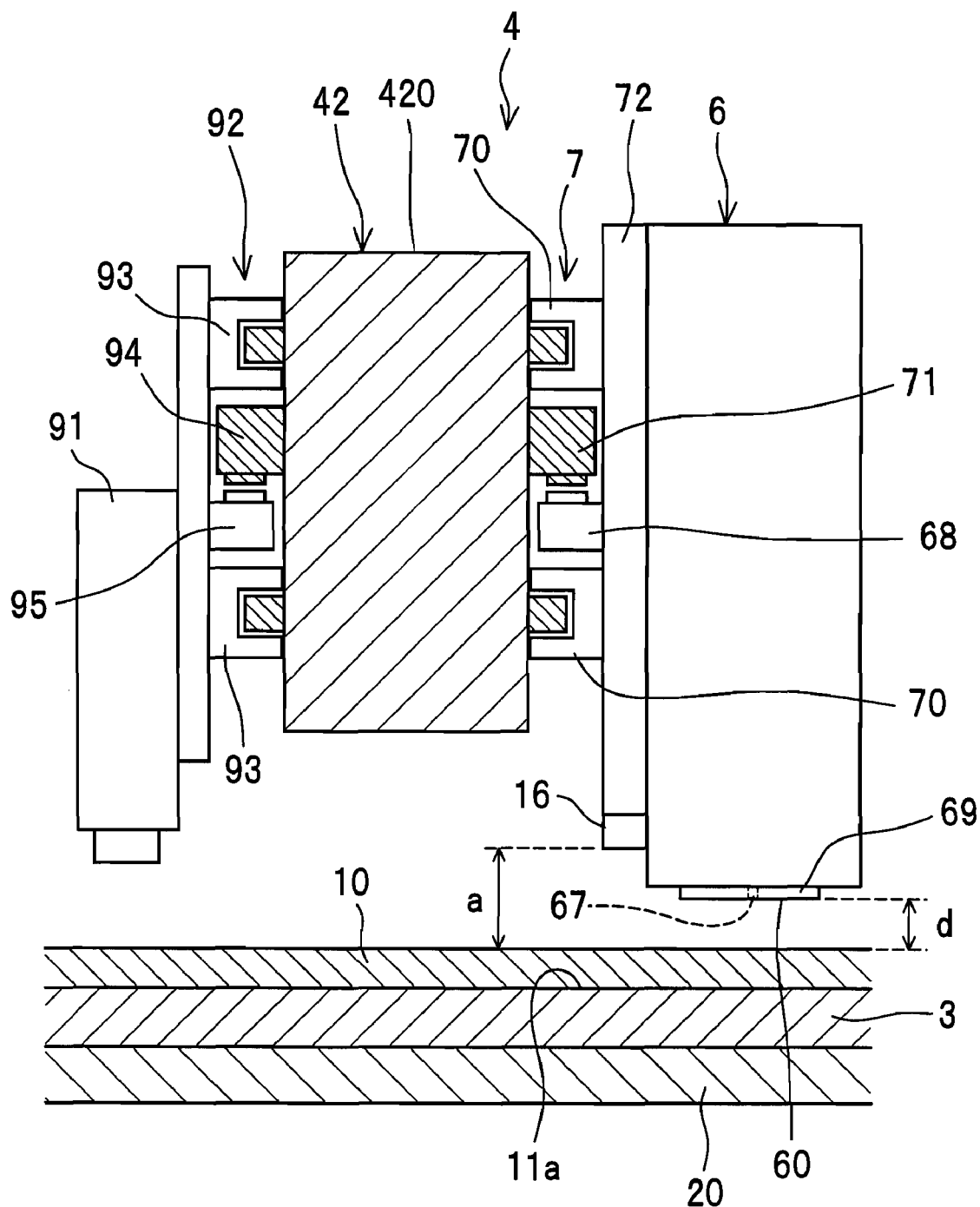
FIG. 6A is a partial sectional view as viewed in X direction of FIG. 1A.

As shown in FIG. 6A, each of the slide mechanisms 7 fitted to the second beam member body 420 and intended for the droplet ejecting sections 6 has two rows of LM guides 70, 70 (made by THK Co., Ltd.) placed above and below, a linear guide 71 placed between the two rows of LM guides 70, 70, and a base plate 72 to which the droplet ejecting section 6 is removably fitted.

Part of each LM guide 70 is fitted to the base plate 72, while the other part of the LM guide 70 is fitted to the second beam member body 420. The part of the LM guide 70 and the other part of the LM guide 70 are slidable relative to each other.

By driving and controlling a linear drive mechanism 68 fitted to the base plate 72 so as to confront the linear guide 71, the linear guide 71 fitted to the second beam member body 420 is enabled to move the droplet ejecting section 6 to a specified position at a front side or depth (in the arrow B direction in FIG. 1A) of the drawing sheet of FIG. 6A.

The linear guide 71 is formed of miniature N-pole and S-pole permanent magnets arrayed alternately and regularly. The linear drive mechanism 68 is capable of freely generating N poles and S poles by AC control, making it possible to exert positional control of the droplet ejecting sections 6 on the slide mechanisms 7 by magnet force of the linear guide 71 and the linear drive mechanism 68.

An effective movement stroke of the LM guides 70 is 250 mm, and the linear guide 71 is set over a range equal to or more than this effective stroke.

The height precision of the slide mechanisms 7 is such high that variations of the distance from the ejecting surfaces 60 of the droplet ejecting sections 6 to the substrate 10 are no more than 10 μm for a 250 mm move.

The slide mechanisms 7 of the first beam member 41 are also similar in construction, and so its description is omitted.

The droplet ejecting section 6 is separably fitted to the base plate 72, and upon occurrence of any impropriety, the droplet ejecting section 6 is separated from the base plate 72 for replacement.

Fitted to a lower end of the base plate 72 is the reference member 16 adjusted so that its distance to the top face of the substrate 10 (i.e., to the mounting surface 11a) becomes a specified value. The reference member 16 is a plate such as a reflecting plate.

Since the reference member 16 is fitted to the base plate 72, a distance 'a' from the top face of the substrate 10 to the reference member 16 is constant regardless of separation or replacement of the droplet ejecting section 6. In this embodiment, the value of 'a' is 80 mm.

A distance 'd' between the top face of the substrate 10 and the ejecting surface 60 of the droplet ejecting section 6 varies depending on errors in manufacture of the droplet ejecting section 6, errors in fitting of the droplet ejecting section 6 to the base plate 72, and other causes. Therefore, when the droplet ejecting section 6 is replaced, the height of the ejecting surface 60 is adjust so that the distance from the ejecting surface 60 to the top face of the substrate 10 necessarily becomes a specified value. This is because the landing precision would be lowered by larger variations in the distance between the ejecting surface 60 and the substrate 10 among the plurality of droplet ejecting sections 6, or by a larger distance between the ejecting surface 60 and the substrate 10. In this embodiment, the value of 'd' is adjusted to 0.5 mm±20 μm.

Figure 6B:
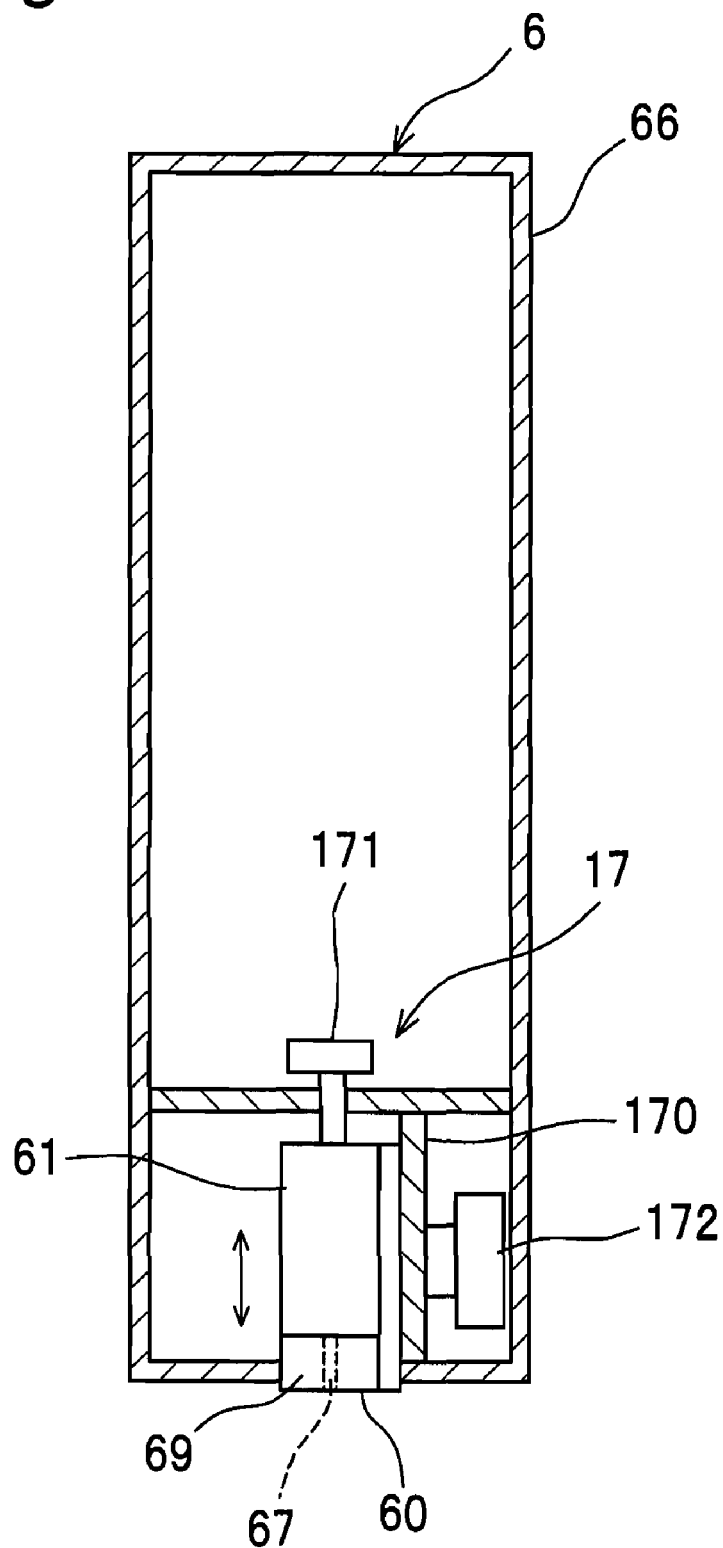
FIG. 6B is a sectional view of a droplet ejecting section showing its adjustment member.

As shown in FIG. 6B, the droplet ejecting section 6 internally has an adjustment member 17. The adjustment member 17 adjusts a gap between the ejecting surface 60 and the mounting surface 11a by moving the ejecting surface 60 closer to or farther from the mounting surface 11a.

The adjustment member 17 has a fixing part 170 provided inside the box frame 66, an adjustment screw 171 inserted into the fixing part 170 and screwed to a top face of the ejecting element 61, and a fixing screw 172 inserted into the fixing part 170 and screwed to a side face of the ejecting element 61.

Turning the adjustment screw 171 allows the height of the ejecting element 61 to be adjusted. Turning the fixing screw 172 allows the ejecting element 61 to be put into contact with or separation from the fixing part 170. That is, tightening the fixing screw 172 causes the ejecting element 61 to be pressed against the fixing part 170, by which the ejecting element 61 is positioned.

Since the fixing screw 172 contains an unshown compression spring, the ejecting element 61 is pressed against the fixing part 170 with a constant pressure even while the fixing screw 172 is loosened.

With the fixing screw 172 loosened and the ejecting element 61 pressed against the fixing part 170 only by the compression spring, the ejecting element 61 can be freely varied in height by turning the adjustment screw 171.

As shown in FIG. 6A, the slide mechanism 92 fitted to the second beam member body 420 and intended for the observation camera 91, similar in construction to the slide mechanism 7, has two rows of LM guides 93, 93 (made by THK Co., Ltd.) placed above and below, and a linear guide 94 placed between the two rows of LM guides 93, 93.

Part of each LM guide 93 is fitted to the observation camera 91, while the other part of the LM guide 93 is fitted to the second beam member body 420. The part of the LM guide 93 and the other part of the LM guide 93 are slidable relative to each other.

By driving and controlling a linear drive mechanism 95 fitted to the observation camera 91 so as to confront the linear guide 71, the linear guide 94 fitted to the second beam member body 420 is enabled to move the observation camera 91 to a specified position at a shortage or depth (in the arrow B direction in FIG. 1A) of the drawing sheet of FIG. 6A. The linear guide 94 and the linear drive mechanism 95 are similar in construction to the linear guide 71 and the linear drive mechanism 68, and so their description is omitted. The effective movement stroke of the LM guides 93 is 2500 mm, and the linear guide 94 is set over a range equal to or more than this effective stroke.

The observation camera 91 is enabled to output address information of the substrate 10 relative to the alignment marks 110 by an arrow-A-direction information acquisition function provided in the arm part moving mechanisms 5 as well as an arrow-B-direction information acquisition function provided in the slide mechanism 92.

The observation camera 91 is principally enabled to observe a landing image of landing on the substrate 10 by the droplet ejecting sections 6, and output ejection states of the respective droplet ejecting sections 6 or addresses of the landing positions on a basis of the alignment marks.

By using landing position coordinates acquired by the observation camera 91, correction of ejection timing in the arrow A direction is performed for the respective droplet ejecting sections 6, while correction of moving amounts of the slide mechanisms 7 in the arrow B direction is performed, by which droplets can be landed on desired positions on the substrate 10.

Figure 7A:
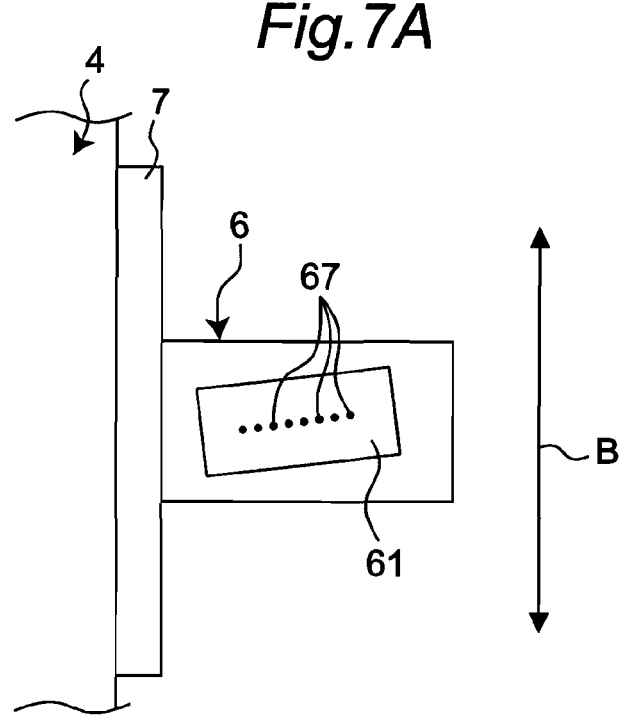
FIG. 7A is a bottom view of a droplet ejecting section.

As shown in the bottom view of FIG. 7A, each droplet ejecting section 6 has the ejecting element 61 for ejecting one kind of liquid. The nozzle openings 67 in the bottom face of the droplet ejecting section 6 are arrayed in one row, being inclined by a few degrees from perpendicularity with respect to the arrow B direction. The nozzle openings 67 all eject the same droplet material.

Figure 7B:
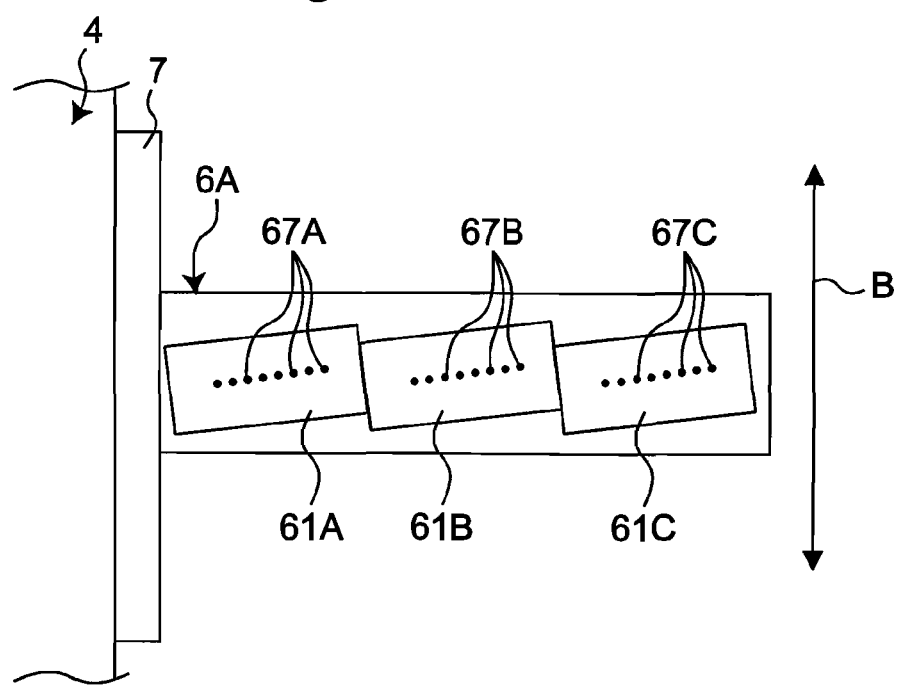
FIG. 7B is a bottom view of another droplet ejecting section.

The droplet ejecting section, as shown in FIG. 7B, may be a droplet ejecting section 6A having ejecting elements 61A, 61B, 61C for ejecting three kinds of liquids. That is, this droplet ejecting section 6A has the ejecting element 61A for ejecting a first droplet material, the ejecting element 61B for ejecting a second droplet material, and the ejecting element 61C for ejecting a third droplet material.

Nozzle openings 67A, 67B, 67C of the ejecting elements 61A, 61B, 61C, respectively, are inclined by a few degrees from perpendicularity with respect to the arrow B direction, and projection areas of the nozzle openings 67A, 67B, 67C, respectively, in the arrow B direction generally coincide with one another.

In addition, the nozzle openings 67A, 67B, 67C may be minutely movable in the arrow B direction within the droplet ejecting sections 6, respectively.

Next, operation of the droplet applying apparatus having the above-described construction is explained.

Figure 8A:
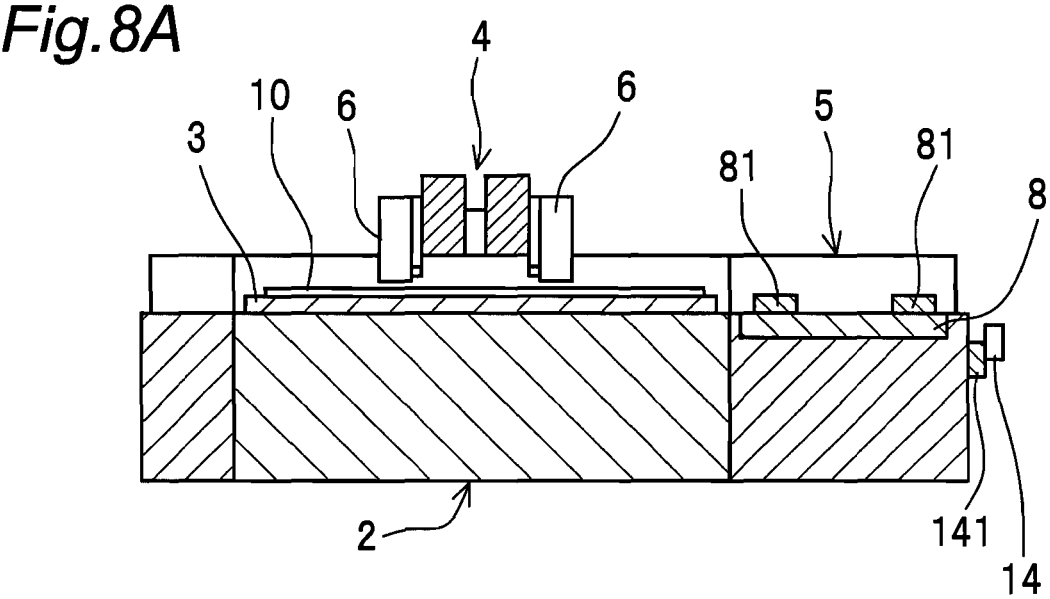
FIG. 8A is a function explanatory view showing a state at an end of substrate processing.
Figure 8B:
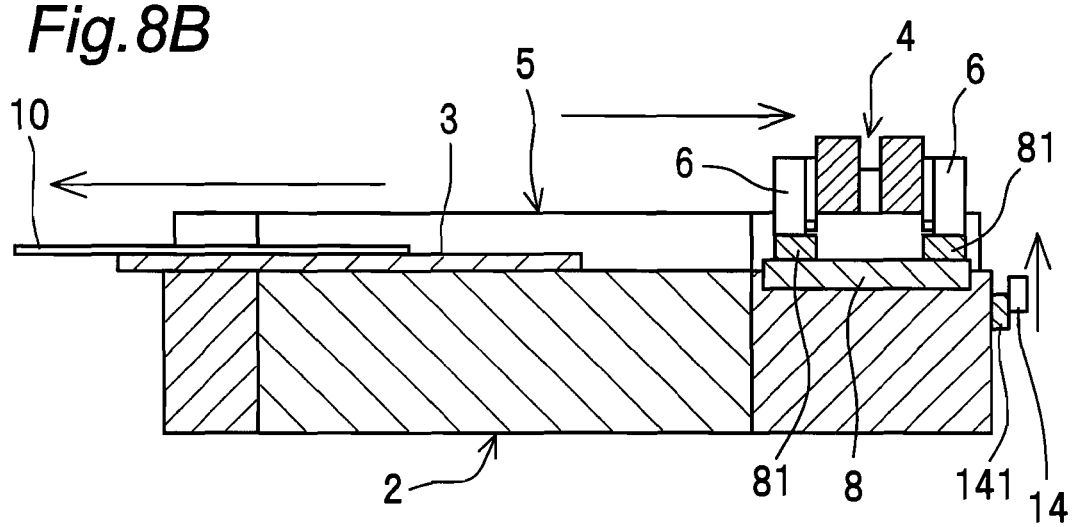
FIG. 8B is a function explanatory view showing a state that the substrate is carried out.
Figure 8C:
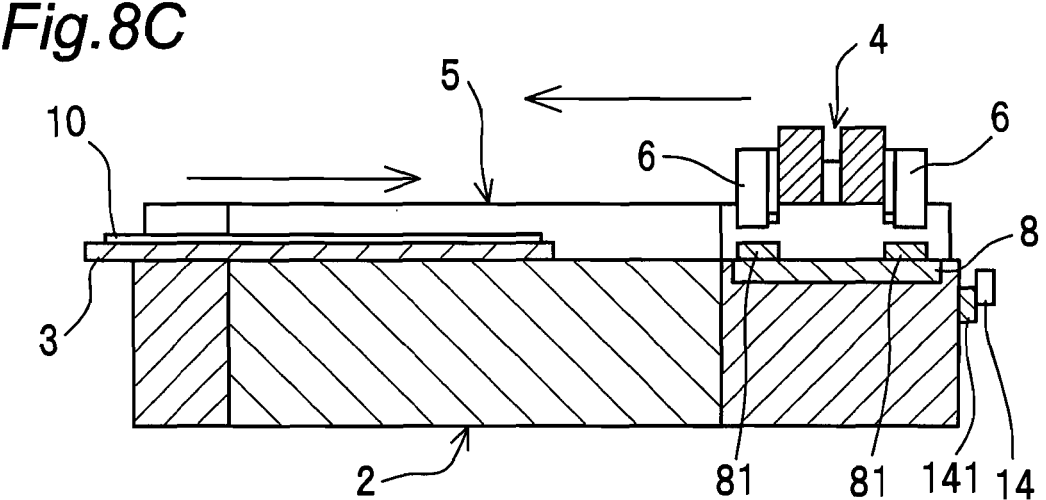

With reference to FIGS. 8A, 8B and 8C, carry-out and -in operation of the substrate 10 is described. As shown in FIG. 8A, the substrate 10 has been completely processed, and after the processing, the mounting stage 3, as shown in FIG. 8B, is slid leftward in the drawing sheet while the arm part 4 is moved to just above the maintenance mechanism 8. Then, after the suction of the processing-completed substrate 10 is released, the substrate 10 is delivered to an unshown transfer robot. Thereafter, the transfer robot mounts a next substrate 10 onto the mounting stage 3.

Then, the substrate 10 mounted on the mounting stage 3 is air sucked immediately to the mounting stage 3 as shown in FIG. 8C, and the mounting stage 3 and the arm part 4 are returned to their original positions as shown in FIG. 8A.

During the time duration from the carry-out of the substrate 10 from the mounting stage 3 to the carry-in of the next substrate 10 and further to the return of the mounting stage 3 to the original position, ordinary maintenance operation with the droplet ejecting sections 6 is performed in parallel.

In this maintenance operation, the arm part 4 is moved onto the maintenance mechanism 8, followed by maintenance work.

More specifically, a lower surface of the nozzle plate 69 of the droplet ejecting section 6 is capped with a rubber-made cap member 81 as shown in FIG. 8B. Then, vacuum suction is effected through an air hole provided in a bottom portion of the cap member 81, so that the liquid is forcedly discharged through the nozzle openings 67 of the nozzle plate 69, by which dust or the like of the nozzle openings 67 is removed.

Thereafter, the lower surface of the nozzle plate 69 is wiped off by an unshown wipe blade. Then, the ejection state of the nozzle openings 67 is checked by an unshown non-ejection detecting mechanism. It is noted that the series of these maintenance operations may be done in a sequence different from the above-described one.

The mounting stage 3 on which the new substrate 10 is mounted, and the arm part 4 that has been completed with the maintenance operation of the droplet ejecting sections 6, are moved nearly simultaneously in the arrow directions of FIG. 8C so as to be returned to the positions of FIG. 8A.

Next, the maintenance operation for the droplet applying apparatus 1 is explained. While the carry-out/in of the substrate 10 is being executed, or while the droplet ejecting operation to the substrate 10 is kept out of execution for long periods, maintenance operation for the droplet ejecting sections 6 is executed. This maintenance operation includes non-ejection detection, capping, in-cap suction purge and wiping to be done.

In the case where the processing of the next substrate 10 is performed immediately after the processing of the foregoing substrate 10, simultaneously with a command for the carry-out operation of the foregoing substrate 10, the arm part 4 with the droplet ejecting sections 6 mounted thereon is given a command for movement to just above the maintenance mechanism 8.

The maintenance mechanism 8 has a non-ejection detecting mechanism for detecting ejection failures of the droplet ejecting sections 6. The non-ejection detecting mechanism is provided for each of the droplet ejecting sections 6.

Figure 9A:
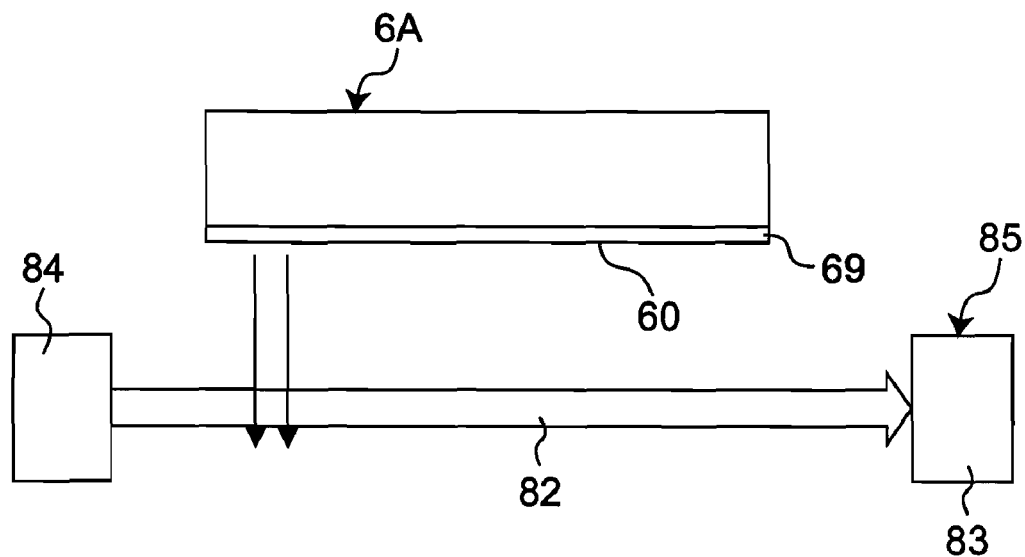
FIG. 9A is a side view of a non-ejection detecting mechanism.
Figure 9B:
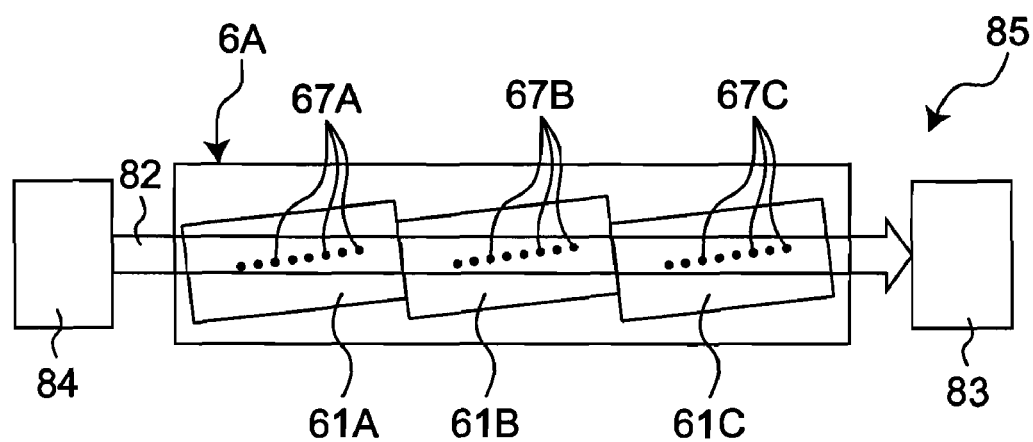
FIG. 9B is a bottom view of the non-ejection detecting mechanism.

As shown in FIGS. 9A and 9B, the non-ejection detecting mechanism 85 has a laser-light emitting element 84 and a laser-light receiving element 83. It is noted that the droplet ejecting section 6A shown in FIG. 7B is used as the droplet ejecting section.

The laser-light emitting element 84 and an unshown laser-light emitting circuit, upon receiving a command for non-ejection detection, emits a laser beam 82 continuously toward the laser-light receiving element 83. A received-light-quantity measuring means connected to the laser-light receiving element 83 stores therein an ordinary received light quantity.

The emission direction of the laser beam 82 is generally parallel to the top surface of the substrate 10 and generally parallel to the ejecting surface of the droplet ejecting section 6A (lower surface of the nozzle plate 69).

The diameter of the laser beam 82 is 1 mm, and droplets ejected from all the nozzle openings 67A, 67B, 67C of one droplet ejecting section 6A pass through within the optical axis of the laser beam 82.

The laser-light emitting element 84 and the laser-light receiving element 83 have a fine adjustment moving mechanism. This fine adjustment moving mechanism adjusts the positions of the laser-light emitting element 84 and the laser-light receiving element 83 in case that droplets do not pass through within the optical axis of the laser beam 82.

Operation of the non-ejection detecting mechanism 85 is explained below.

First, droplets are ejected from the first ejecting element 61A during a certain time period, after which a light quantity from the received-light-quantity measuring means is read and then compared with the ordinary received light quantity to measure an intercepted light quantity, followed by making a decision as to whether or not the measured value is within a range of set values that have preliminarily been set. If the measured value is within the range of set values, the ejection is regarded as a normal ejection, while if the measured value is not within the range of set values, the ejection is regarded as an ejection failure.

Next, for the second ejecting element 61B and the third ejecting element 61C, similar ejection control and intercepted-light-quantity measurement are performed in succession, by which the presence or absence of any ejection failure is checked for all the nozzle openings 67A, 67B, 67C of the droplet ejecting section 6A.

Without any ejection failure, the droplet ejecting section 6A is moved to the cap position, where capping is performed until the carry-in operation of the substrate 10 is almost completed.

With some ejection failure, commonly known recovery operation is performed in which, for example, the droplet ejecting section 6A is moved to the cap position and then capped, the cap being evacuated to effect forced discharge from the nozzle openings, followed by release of the cap, wiping and once more execution of non-ejection detection. Then, the non-ejection detection and the recovery operation are executed at most several times until the ejection failure is eliminated. If the ejection failure is not corrected, the result is outputted to the apparatus.

In addition, in a case where the comparison between the last non-ejection detection result immediately before the processing of the substrate 10 and the first non-ejection detection result executed during the carry-out of the substrate 10 yields recognition of a change in ejection state, the foregoing processing of the substrate 10 is regarded as inappropriate, and the substrate 10 may be discarded or passed to restoration process.

Next, alignment operation of the substrate 10 is explained.

Figure 10A:
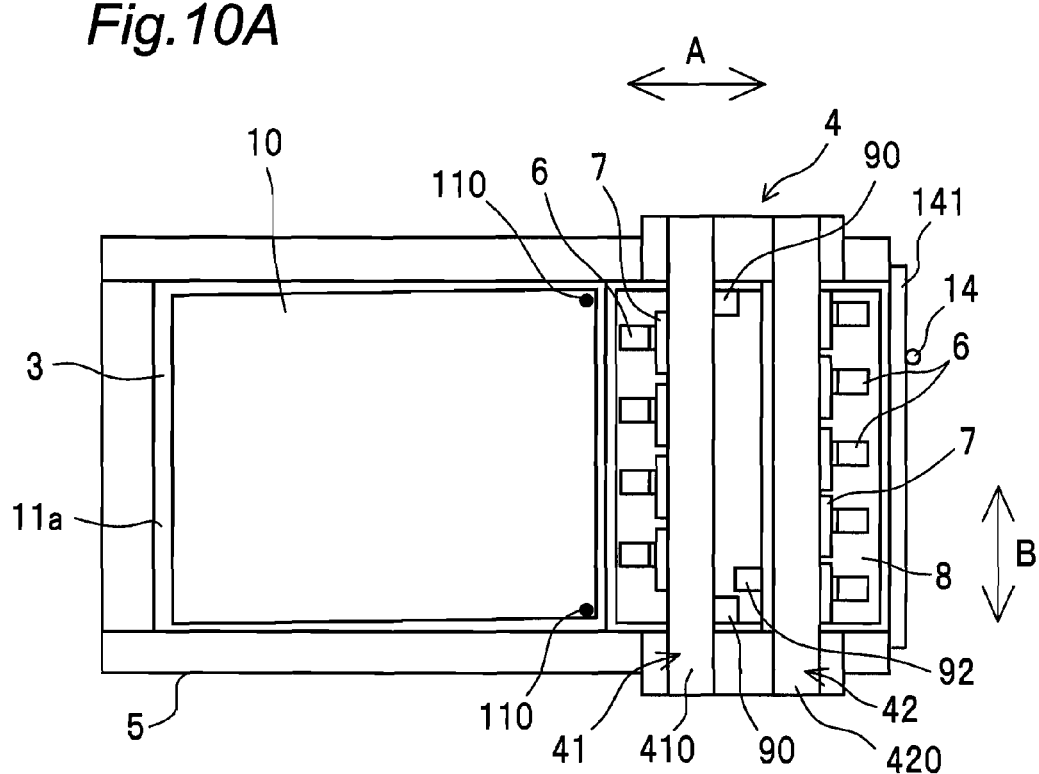
FIG. 10A is a function explanatory view showing substrate alignment operation.
Figure 10B:
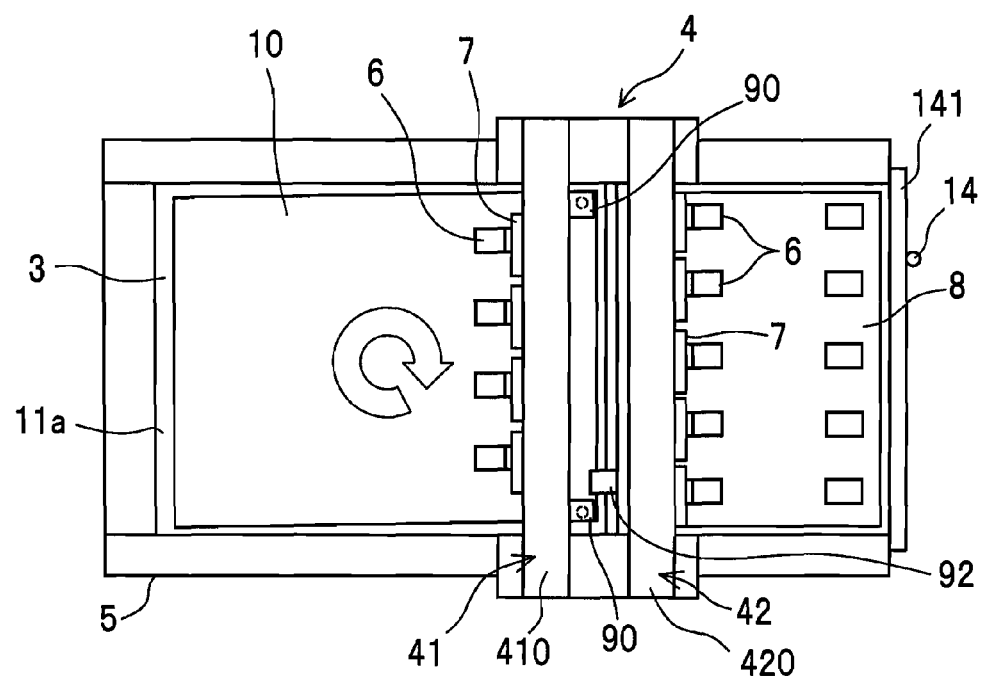
FIG. 10B is a function explanatory view showing substrate alignment operation.

The two image pickup parts 90, 90 fixed to the arm part 4 are moved integrally with the arm part 4 from the position of FIG. 10A to the position of FIG. 10B. Then, based on image information of the image pickup parts 90, the attitude of the substrate 10 is corrected to the arrow direction of FIG. 10B by the attitude adjustment member 12 shown in FIG. 1B.

On the substrate 10, the two alignment marks 110, 110 of high precision are preliminarily provided. The droplet application position of the substrate 10 is predetermined by referencing the alignment marks 110.

The alignment marks 110 are concentric marks, and a pitch difference between the two alignment marks 110, 110 is no more than 2 μm. The two image pickup parts 90, 90 are set on the arm part 4 with a pitch equal to the pitch of the two alignment marks 110, 110.

Also, the reference position of an image pickup part 90 and the landing position of a droplet ejecting section 6 are preliminarily corrected by correction operation with the observation camera 91.

Therefore, by achieving coincidence between the alignment mark 110 of the substrate 10 and the reference position of the image pickup part 90, the landing position of a droplet and the position to apply the droplet thereto can be made coincident with each other.

Figure 11:
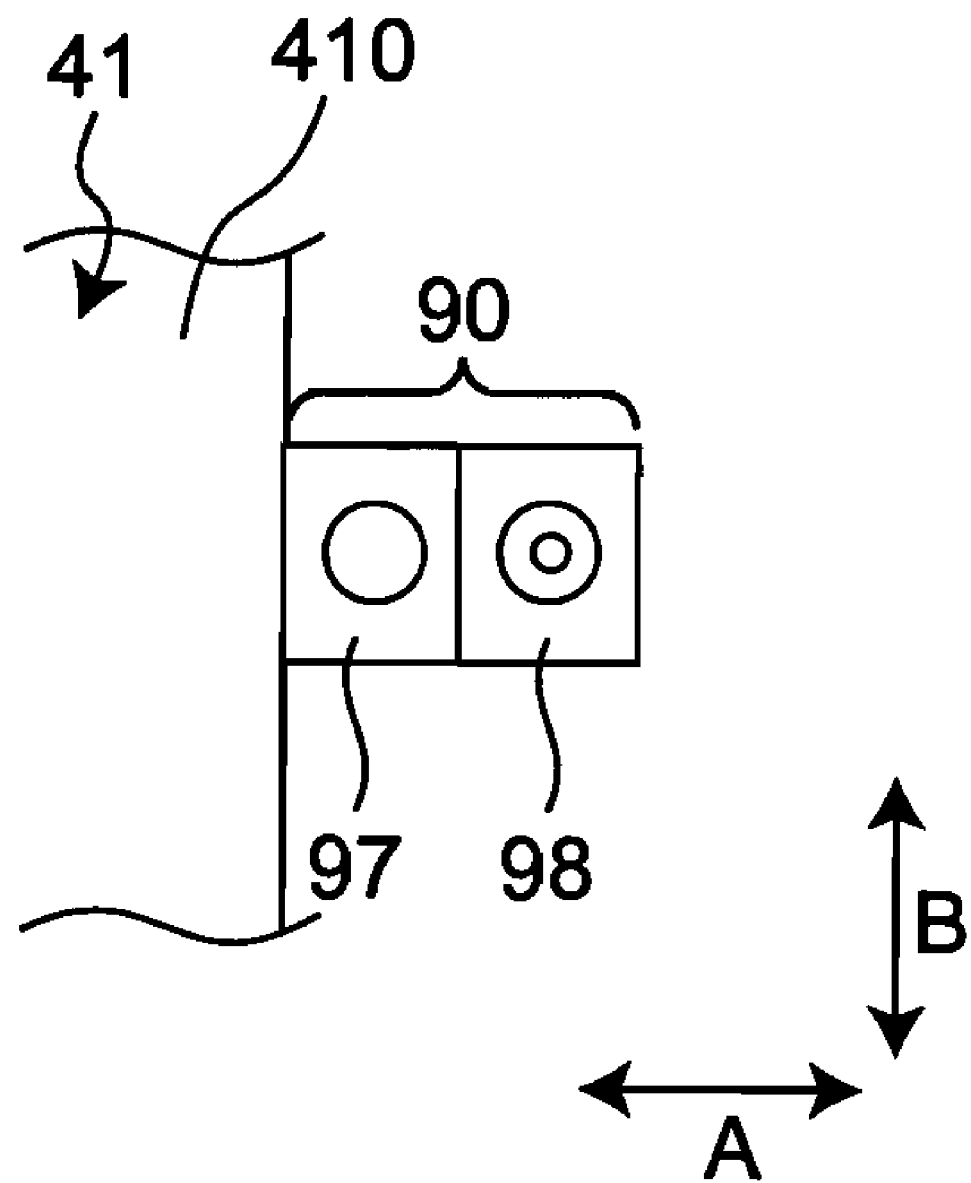
FIG. 11 is an enlarged bottom view of an image pickup part.

As shown in FIG. 11, the image pickup part 90 has a high-magnification mode camera unit 98 and a low-magnification mode camera unit 97. The high-magnification mode camera unit 98 and the low-magnification mode camera unit 97 are fitted to the arm part 4 side by side in the arrow A direction. That is, the low-magnification mode camera unit 97 and the high-magnification mode camera unit 98 are fitted in array to the first beam member 41 in this order.

The alignment reference position of the low-magnification mode camera unit 97 and the alignment reference position of the high-magnification mode camera unit 98 are preliminarily subjected to positional correction so as to be coincident with each other by properly moving the arm part 4.

The low-magnification mode camera unit 97 has a camera mechanism having a focus power of 0.5, thus enabled to pick up an image on the substrate 10 by a CCD camera of 2000000 pixels (1400×1400 pixels), where the image pickup field area is roughly 10 mm square and the image resolution is about 13 μm.

The high-magnification mode camera unit 98 has a camera mechanism having a focus power of 10, thus enabled to pick up an image on the substrate 10 by a CCD camera of 1400000 pixels (1400×1000 pixels), where the image pickup field area is roughly 0.5 mm square and the image resolution is about 0.7 μm.

The low-magnification mode camera unit 97 and the high-magnification mode camera unit 98 are connected to unshown image processing means, respectively.

In the image processing means, alignment mark images picked up by the camera units 97, 98 are binarized to determine a centroidal position of the marks, which is taken as a current alignment-mark center position.

Determining the alignment-mark center position by picking up images of the two alignment marks 110, 110 on the substrate 10 with the two camera units 97, 98 makes it possible to determine alignment quantities for rotational movement and linear movement of the substrate 10.

Figure 12:
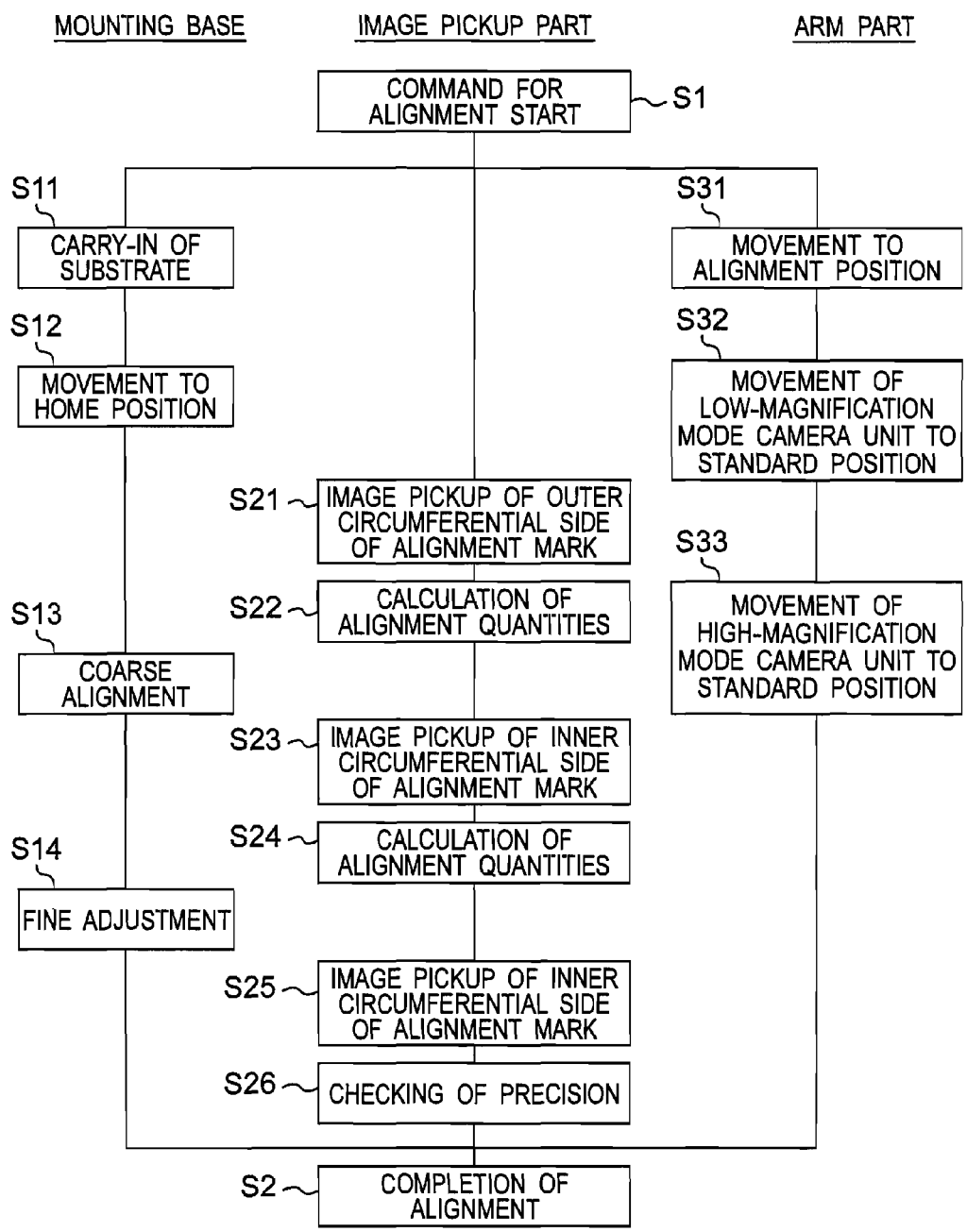
FIG. 12 is a flowchart showing the alignment operation.

FIG. 12 is a flowchart describing, in combination, movements of the mounting stage 3, the image pickup parts 90 and the arm part 4 with respect to the alignment operation.

When a command for alignment start is issued (S1), the unshown transfer robot mounts the substrate 10 onto the mounting stage 3 (S11), and the mounting stage 3 is moved to an alignment home position (S12).

During this operation, the arm part 4 is moved to the alignment position (S31) to move the low-magnification mode camera unit 97 to an alignment standard position where the alignment mark 110 of the substrate 10 is to be detected (S32).

Figure 13A:
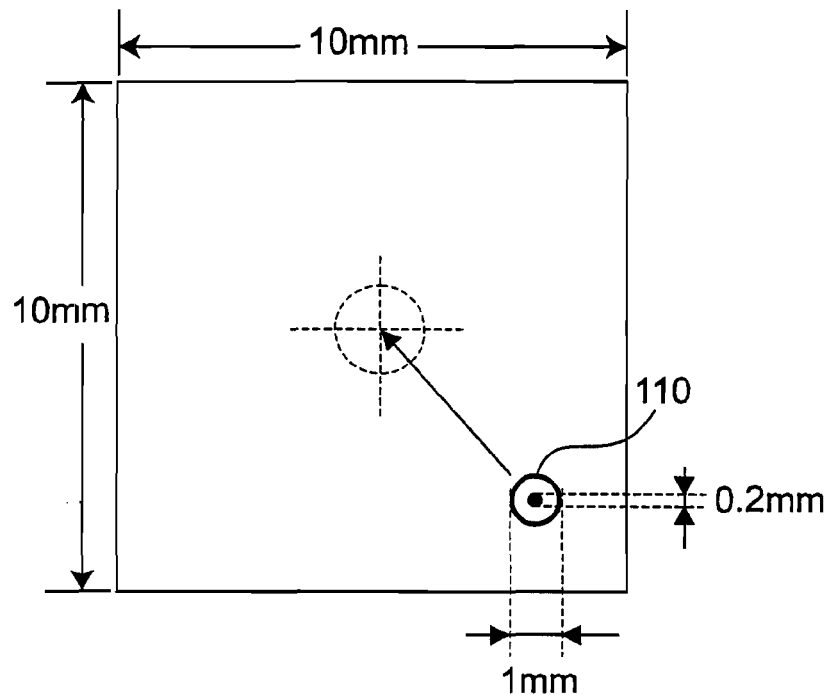
FIG. 13A is an explanatory view showing a field of view of a low-magnification mode camera unit in one image pickup part.
Figure 13B:
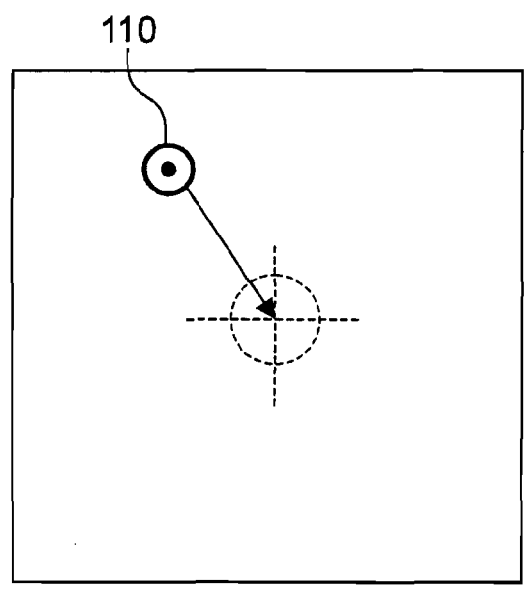
FIG. 13B is an explanatory view showing a field of view of a low-magnification mode camera unit in the other image pickup part.

In this connection, FIGS. 13A and 13B show fields of view of the low-magnification mode camera unit 97 resulting when the movements of the mounting stage 3 and the arm part 4 are completed. FIG. 13A shows a field of view of the low-magnification mode camera unit 97 of one image pickup part 90, and FIG. 13B shows a field of view of the low-magnification mode camera unit 97 of the other image pickup part 90.

The alignment mark 110 has a concentric shape, in which the outer ring for coarse alignment has an outer diameter of 1 mm, while the inner black dot for fine alignment has a diameter of 0.2 mm.

The precision with which the transfer robot mounts the substrate 10 onto the mounting stage 3 is ±3 mm from an ideal position. When the low-magnification mode camera unit 97 having a field area of 10 mm square is moved to the alignment standard position, the alignment mark 110 is necessarily contained in the field of view as shown in FIGS. 13A and 13B.

That is, the low-magnification mode camera unit 97 has a field of view equivalent to or more than the substrate-mounting precision of the transfer robot, thus making it possible to immediately execute alignment operation without performing preliminary alignment operation aimed at making the alignment mark contained in the camera's field of view after the substrate mounting. Moreover, it is unnecessary to additionally provide any sequence or mechanism for searching the surroundings.

In short, the image pickup parts 90, in a low-magnification mode, each have enough field of view to detect the alignment mark 110 of the substrate 10 before the adjustment by the attitude adjustment member 12. Therefore, it is unnecessary to detect the alignment mark 110 before adjusting the attitude of the substrate 10 to make the alignment mark 110 contained in the field of view of the image pickup part 90, and moreover the alignment detection mechanism does not need to be additionally provided, and yet the time taken to adjust the attitude of the substrate 10 can be omitted.

Thereafter, as shown in FIG. 12, images of the alignment marks 110, 110 are picked up by the two low-magnification mode camera units 97, 97, respectively (S21), the centroidal position of the outer ring is read, and alignment quantities that are values by which the substrate 10 should be moved is calculated from deviated directions and deviation quantities of the two marks from their reference position (S22).

Also, at a time point when the image pickup of the alignment marks 110 is completed (S21), the arm part 4 is moved so that the high-magnification mode camera unit 98 is moved to the alignment standard position where the alignment marks 110 of the substrate 10 are to be detected (S33).

After the alignment quantities are determined (S22), coarse alignment of the substrate 10 is executed based on the above-acquired information by the attitude adjustment member 12 (S13).

It is noted here that the term, coarse alignment, refers to moving the alignment mark 110 to the alignment reference position indicated by dotted cruciform lines in FIGS. 13A and 13B.

Figure 14A:
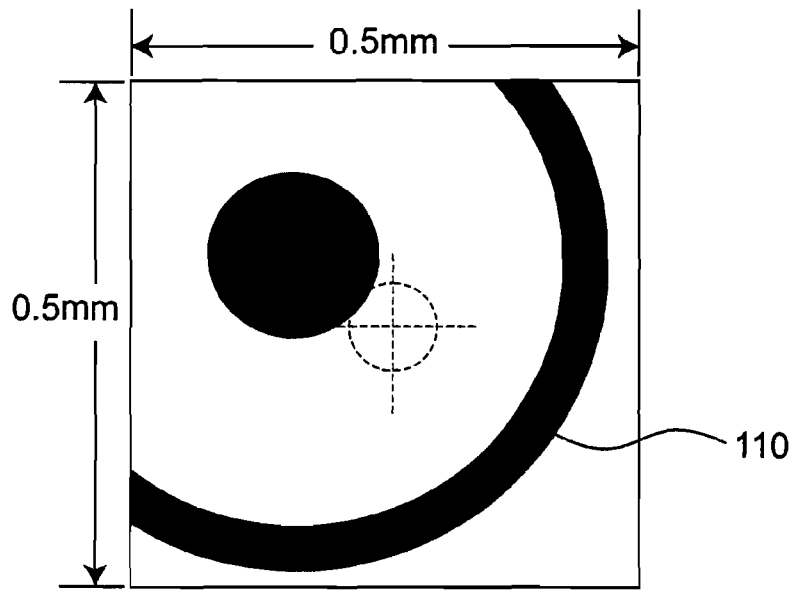
FIG. 14A is an explanatory view showing a field of view of a high-magnification mode camera unit in the one image pickup part.
Figure 14B:
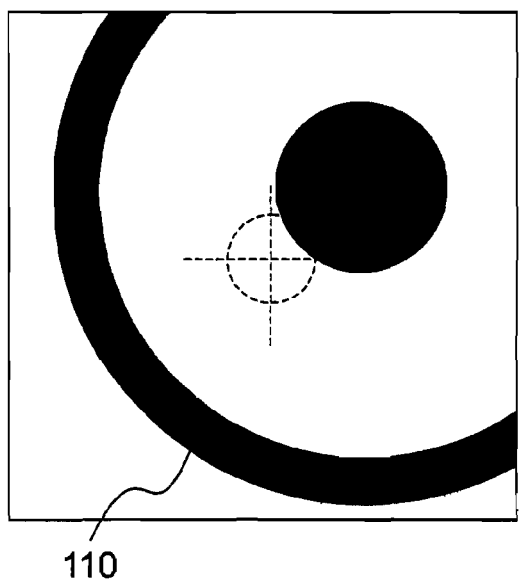
FIG. 14B is an explanatory view showing a field of view of a high-magnification mode camera unit in the other image pickup part.

Thereafter, after the completion of the coarse alignment and the movement of the high-magnification mode camera unit 98, the alignment mark 110 is minutely deviated in the field of view of the high-magnification mode camera unit 98 as shown in FIGS. 14A and 14B. FIG. 14A shows a field of view of the high-magnification mode camera unit 98 of one image pickup part 90, while FIG. 14B shows a field of view of the high-magnification mode camera unit 98 of the other image pickup part 90.

As to the reason of the above deviations, with the field of view of the low-magnification mode camera unit 97, the image resolution is 13 μm and there is a possibility that an error of several tens of micrometers with a deviation of image detection included may occur. As a result, strict deviations could not be resolved even if the coarse alignment is executed.

Thereafter, as shown in FIG. 12, an image of the black dot inside the alignment mark 110 is picked up by the high-magnification mode camera unit 98 (S23), a centroidal position of the inner black dot is read, and alignment quantities that are values by which the substrate 10 should be moved are calculated from deviated directions and deviation quantities of the two marks from their reference position (S24). Based on the resulting alignment quantities, fine adjustment of the substrate 10 is executed by the attitude adjustment member 12 (S14).

It is noted here that the term, fine alignment, refers to moving the alignment mark 110 to the alignment reference position indicated by dotted cruciform lines as shown in FIGS. 14A and 14B.

In this fine adjustment, the image resolution is 0.6 μm, and thus at least 2 μm or lower alignment precision can be achieved.

Thereafter, although not indispensable, an image of the black dot inside the alignment mark 110 is picked up once again by the high-magnification mode camera unit 98 (S25), it is checked for precision whether or not any deviation has occurred (S26), thus the alignment being completed (S2).

Next, measurement of droplet landing positions by the observation camera 91 is explained with reference to FIGS. 15A and 15B.

The observation camera 91 is used to acquire information for execution of landing position correction in replacement of the ejecting elements 61 of the droplet ejecting sections 6, or to reconfirm the landing positions during the use of the ejecting elements 61. The observation camera 91 performs image pickup of any arbitrary position on the apparatus top surface as well as determination of the position with the arm part moving mechanisms 5 and the slide mechanism 92.

The image pickup position of the observation camera 91 is outputted by scales internally provided in the arm part moving mechanisms 5 and the slide mechanism 92.

Figure 15A:
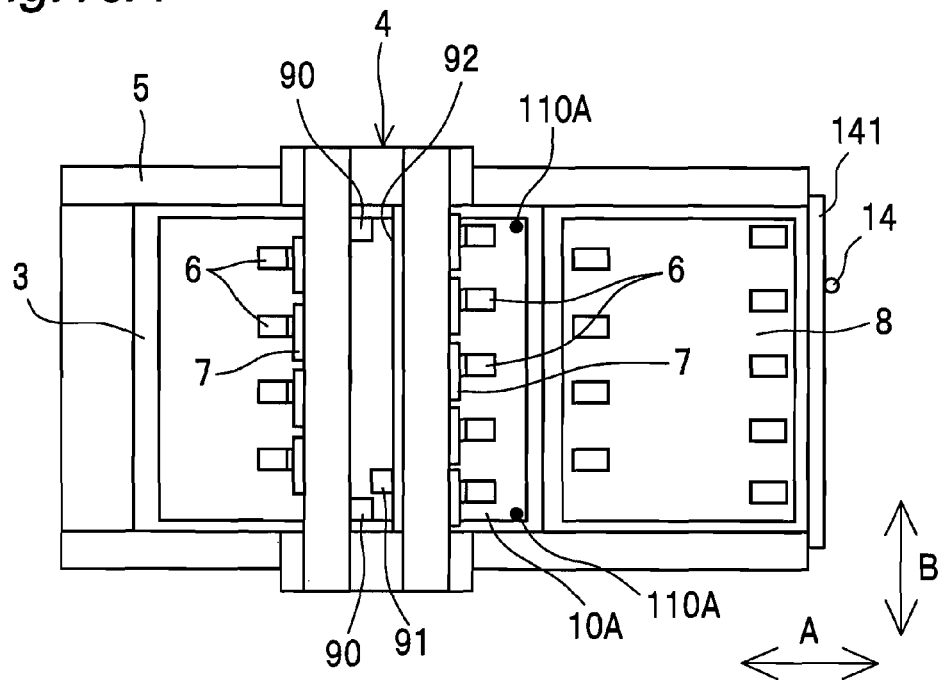
FIG. 15A is a function explanatory view showing measurement of droplet landing positions with an observation camera.

In the observation of droplet landing positions, a dummy substrate 10A on which specified alignment marks 110A similar to those of ordinary substrates 10 are given is carried as the substrate into the apparatus as shown in FIG. 15A, then subjected to substrate attitude control as it is normally done. The observation camera 91 picks up images of the two alignment marks 110A, 110A, respectively, on the dummy substrate 10A, by which their positional information is acquired.

Then, the arm part 4 is moved to an arbitrary position of the dummy substrate 10A. Droplets are ejected from the nozzle openings of the individual droplet ejecting sections 6 toward the dummy substrate 10A. In this operation, droplets may be ejected from all the nozzle openings.

In the individual droplet ejecting sections 6, virtual landing positions (ideal landing positions) are recognized by the scales contained in the arm part moving mechanisms 5 and the slide mechanism 92.

Figure 15B:
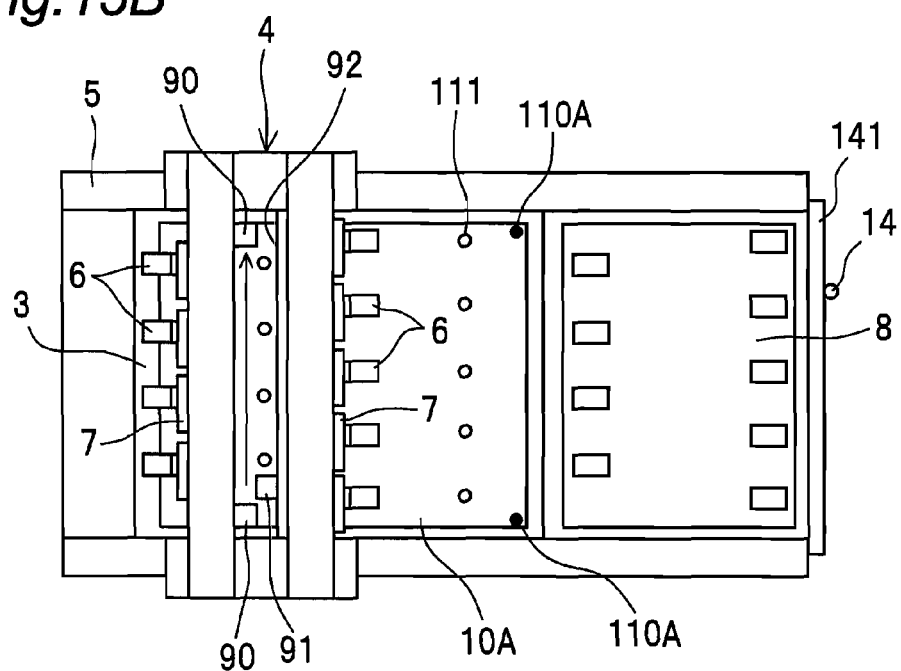
FIG. 15B is a function explanatory view showing measurement of droplet landing positions with the observation camera.

Thereafter, as shown in FIG. 15B, the observation camera 91, while being moved by the arm part moving mechanisms 5 and the slide mechanism 92, picks up images of droplet landing positions 111 in succession to determine actual landing positions from the alignment marks 110A.

Then, deviations between the virtual landing positions and the actual landing positions are stored as correction data for the individual droplet ejecting sections 6, respectively. These deviations are factorized into the arrow A direction and the arrow B direction.

Since the droplet ejection from the droplet ejecting sections 6 is performed with the arm part 4 kept moving in the arrow A direction, deviations in the arrow A direction can be corrected by adjusting the ejection timing of the droplet ejecting sections 6. Deviations in the arrow B direction are corrected by offset of moving amounts of the slide mechanisms 7. These operations may include detection of non-ejecting nozzle for each nozzle or detection of landing variations.

Figure 16A:
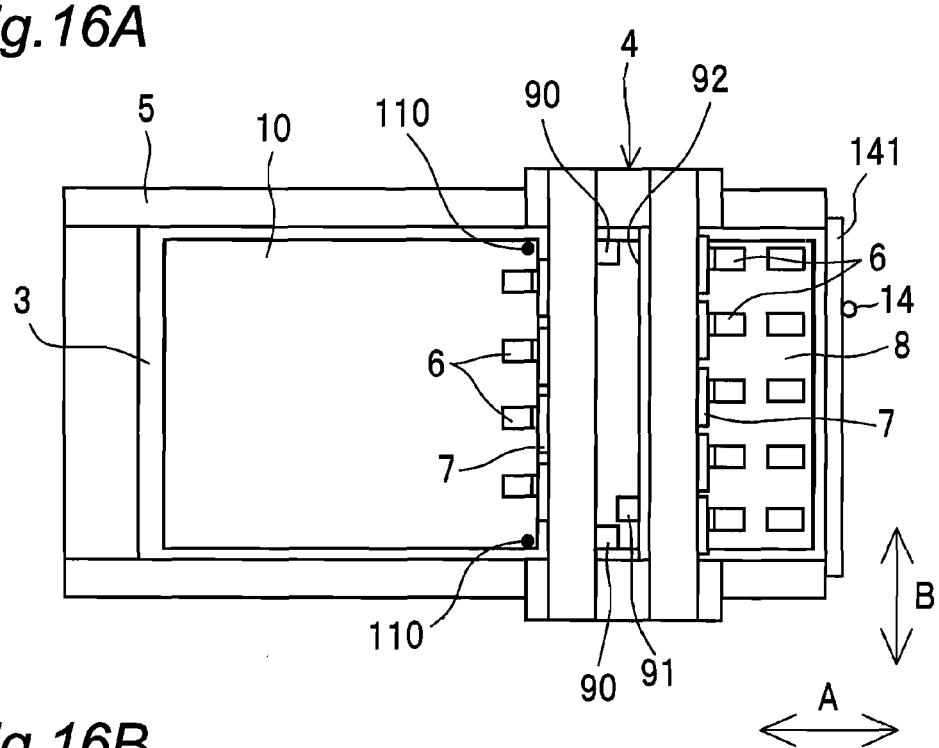
FIG. 16A is a function explanatory view showing a state that an arm part has moved rightmost in a drawing sheet in the process of droplet dropping to the substrate.
Figure 16B:
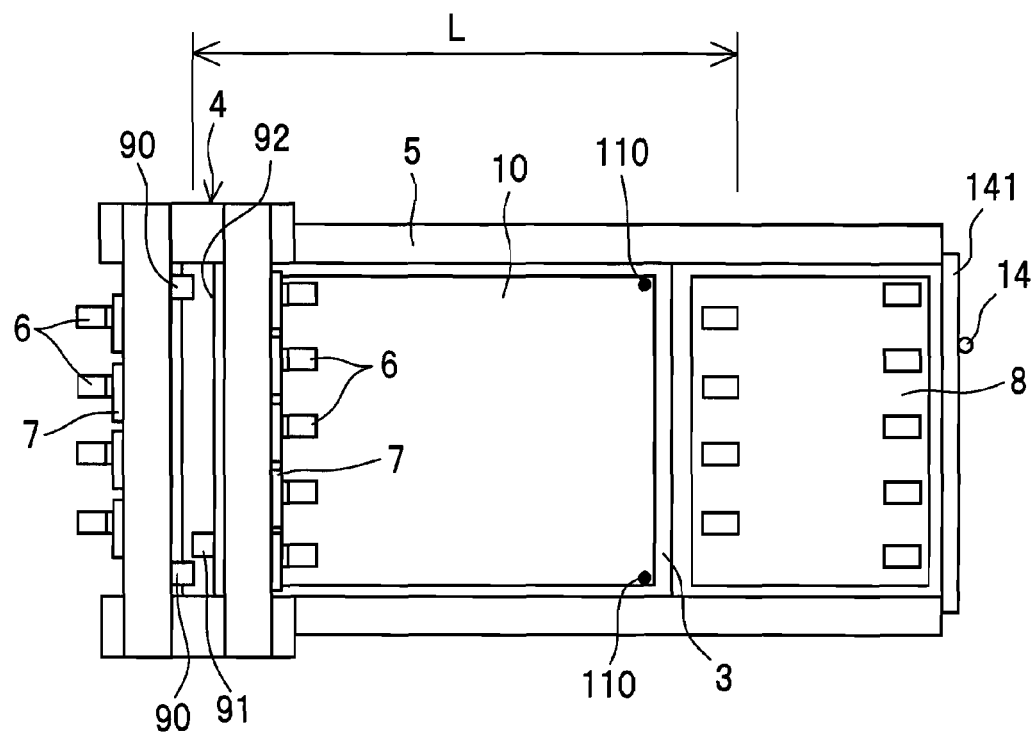
FIG. 16B is a function explanatory view showing a state that the arm part has moved leftmost in a drawing sheet in the process of droplet dropping to the substrate.

Next, the method of dropping droplets to desired positions referenced by alignment marks on the substrate 10 that has been completely attitude-controlled is explained with reference to FIGS. 16A and 16B. FIG. 16A shows a state that the arm part 4 has moved rightmost in the drawing sheet in the process of droplet dropping to the substrate 10. FIG. 16B shows a state that the arm part 4 has moved leftmost in the drawing sheet in the process of droplet dropping to the substrate 10. The arm part 4 reciprocates one to plural times over a range of a length L in the arrow A direction.

The plurality of droplet ejecting sections 6 mounted on the arm part 4 are movable in the arrow B direction independently of one another. The arm part 4 is reciprocatively moved in the arrow A direction on the substrate 10.

Before execution of the droplet ejecting operation, the individual droplet ejecting sections 6 are moved to addresses in the arrow B direction, which are desired positions, and stopped there. Then, during the reciprocative movement of the arm part 4 in the arrow A direction, droplets are ejected at a time point when addresses in the arrow A direction and the arrow B direction have become coincident with those of the desired positions. This operation is controlled for the plurality of droplet ejecting sections 6 independently of one another.

Next, the operation of ejecting droplets to the substrate 10 by the droplet ejecting sections 6 is explained with reference to FIG. 17.

On the arm part 4 are mounted the nine droplet ejecting sections 6 that are movable in the arrow B direction independently of one another. Assigned areas on the substrate 10 are set for the droplet ejecting sections 6, respectively.

While a plurality of defect portions 113 are present scatteredly on the substrate 10, the droplet ejecting sections 6 have their respective assigned areas zonally divided along the arrow B direction. A hatched area 114 in the figure is assigned to the first droplet ejecting section 6A. An area 115 is assigned to the second droplet ejecting section 6B. These respective droplet ejecting sections 6 perform droplet ejecting operation for the defect portions 113 present in the their respective assigned areas.

During the repeated reciprocative movement of the arm part 4 in the arrow A direction, the individual droplet ejecting sections 6 are moved in the arrow B direction independently so as to be moved to just above their assigned defect portions 113, respectively, and stopped at places of coincidence of addresses in the arrow B direction, keeping on standby until there comes coincidence of addresses in the arrow A direction by the movement of the arm part 4. Then, at a timing when the desired positions on the substrate 10 come just below, the droplet ejecting sections 6 are driven to eject droplets to the desired positions on the substrate 10.

Next, a process that the droplet ejecting sections 6 eject droplets to a plurality of the defect portions 113, which are rectangular-shaped recesses, during the reciprocative movement of the arm part 4 is explained with reference to FIGS. 18A to 18D. It is noted here that the term, defect portions 113, refers to portions where, with respect to portions having dust mixed in the manufacturing process, portions having blank dips formed therein, and the like, those failures are corrected into recesses of a certain shape by laser or the like.

On the assumption that all the droplet ejecting sections 6 eject one identical droplet material, a restoration method for defects of one kind of pixel (either one of red, blue or yellow) is described below. In addition, restoration of defect portions of all the colors is enabled by providing three units of this apparatus for the color materials, respectively, to perform successive processing, or by enabling such a droplet ejecting section 6A as shown in FIG. 7B to implement ejection of a plurality of colors.

FIGS. 18A to 18D are explanatory views regarding one of the plurality of droplet ejecting sections 6 mounted on the arm part 4 and showing, in time series, the execution of ejecting operation for a plurality of defect portions 113 from one droplet ejecting section 6.

Figure 18A:
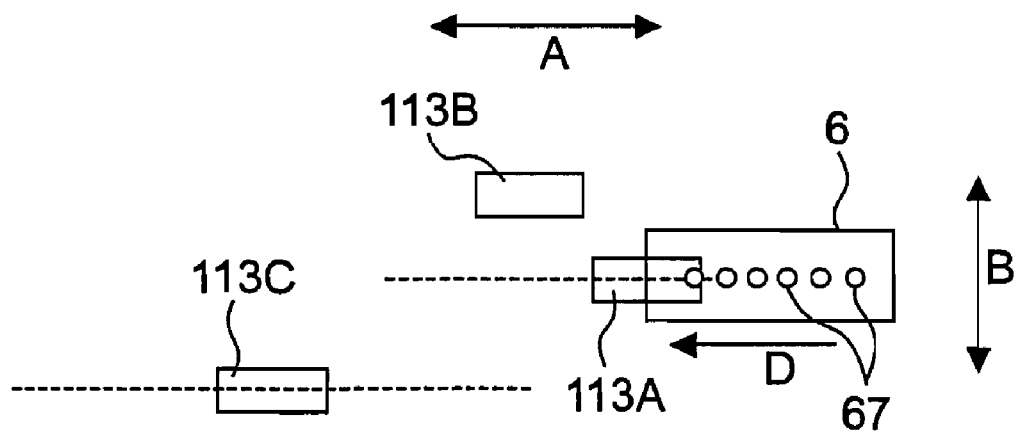
FIG. 18A is a function explanatory view showing an operation that droplets are ejected from the droplet ejecting section to defect portions.

As shown in FIG. 18A, defect portions 113A, 113B, 113C on the substrate are recess portions each having a depth of about 2 μm, their openings each having a roughly 200 μm×70 μm rectangular shape with its longer sides extending along the moving direction (arrow A direction) of the arm part 4. It is noted that the array direction of the nozzle openings 67 of the droplet ejecting section 6 is parallel to the arrow A direction, but actually inclined by a few degree as shown in FIG. 7A.

First, for ejection of droplets and restoration for the defect portion 113A, the droplet ejecting section 6 is moved at high speed by using the slide mechanism 7, and stopped with the nozzle openings 67 aligned on a center line of the defect portion 113A.

The time of movement of the droplet ejecting section 6 has to include, in addition to the time of actual movement, a settling time that elapses from the stop of the droplet ejecting section 6 until damping of residual vibrations due to the movement of the droplet ejecting section 6 to such a level that droplet ejection of the droplet ejecting section 6 is not adversely affected.

The droplet ejecting section 6, which has preliminarily been moved to above the center line of the defect portion 113A, is moved in an arrow D direction by constant-speed movement of the arm part 4 to eject droplets from the nozzle openings 67 located above the defect portion 113A.

For this operation, a plurality of nozzle openings 67 just above the defect portion 113A may be used, so that the speed of the constant-speed movement of the arm part 4 is raised, compared with the case where one nozzle opening 67 is used, making it possible to improve the processing speed for the substrate as a whole.

Figure 18B:
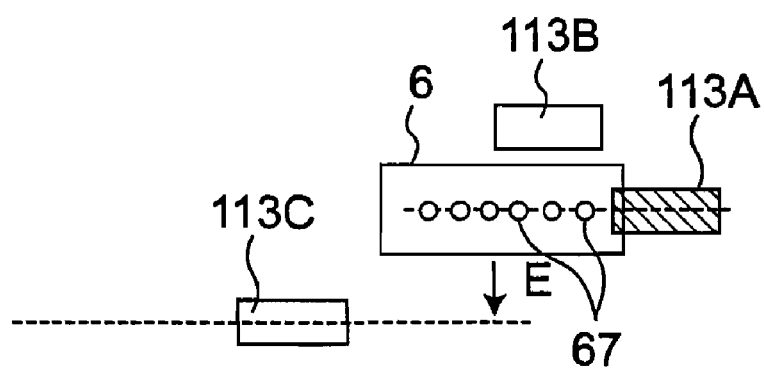
FIG. 18B is a function explanatory view showing an operation that droplets are ejected from the droplet ejecting section to defect portions.
Figure 18C:
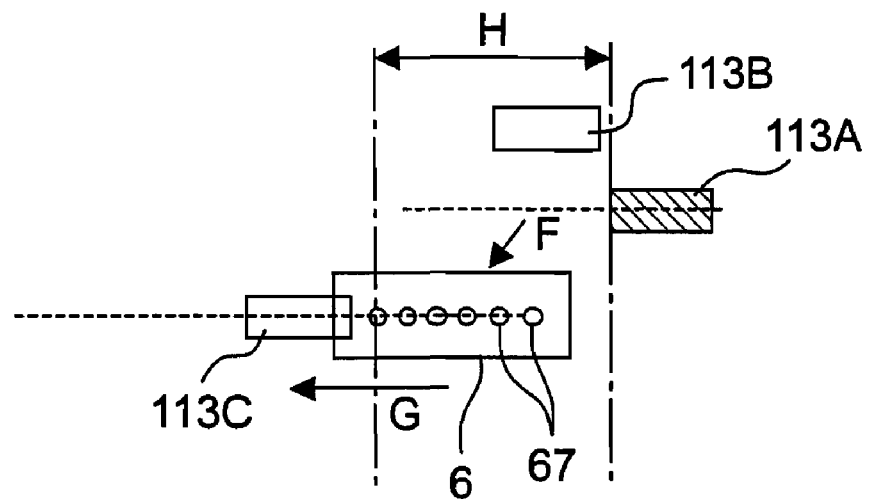
FIG. 18C is a function explanatory view showing an operation that droplets are ejected from the droplet ejecting section to defect portions.

Thereafter, the droplet ejecting section 6, which has ejected droplets onto the defect portion 113A, is moved in an arrow E direction by the slide mechanism 7 to restore another defect portion 113C as shown in FIG. 18B, being stopped at a position where the center line of the defect portion 113C and the array direction of the nozzle openings 67 coincide with each other. During this operation, since the arm part 4 is also moved leftward in the drawing sheet at a constant speed, the droplet ejecting section 6 is moved in an arrow F direction relative to the substrate 10 as shown in FIG. 18C.

Then, by the movement of the arm part 4, the droplet ejecting section 6, while being moved in an arrow G direction, ejects droplets from the nozzle openings 67 located just above the defect portion 113C to restore the defect portion 113C.

Figure 18D:
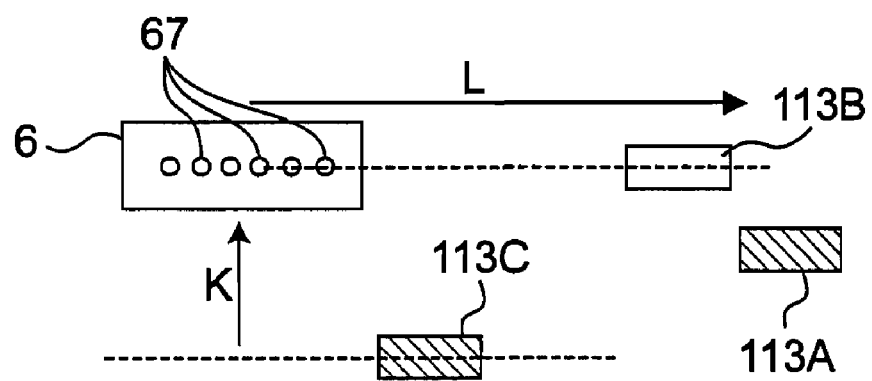
FIG. 18D is a function explanatory view showing an operation that droplets are ejected from the droplet ejecting section to defect portions.

After that, the arm part 4 starts to be moved in the opposite direction after the completion of one-direction movement. As shown in FIG. 18D, the droplet ejecting section 6 is moved in an arrow K direction by the slide mechanism 7 to restore yet another defect portion 113B, being stopped with the array direction of the nozzle openings 67 coincident with the center line of the defect portion 113B. Then, by movement of the arm part 4, the droplet ejecting section 6 is moved in an arrow L direction to eject droplets from the nozzle openings 67 located just above the defect portion 113B.

Consequently, by utilizing the reciprocating operation of the arm part 4, the restoration of the three defect portions 113A, 113B, 113C is carried out in an order of the defect portion 113A to the defect portion 113C to the defect portion 113B, with the best utilization of advantages of this apparatus construction.

That is, as shown in FIGS. 18A to 18D, for the ejection to the defect portion 113A with a plurality of nozzle openings 67, the droplet ejecting section 6 cannot be moved until the rightmost nozzle opening 67, as in the drawing sheet, that actually performs the ejection comes away from just above the defect portion 113A. At least in a region corresponding to the end-to-end distance of the nozzle openings 67 to be used, the droplet ejecting section 6 cannot be moved in the up/down direction, as in the drawing sheet, so as to be directed toward restoration of the next defect portion.

That is, the unmanageable region H includes a zonal region corresponding to the end-to-end distance of the in-use nozzle openings 67 from an end of the defect portion immediately after the processing, as well as a region resulting from multiplying the moving speed of the arm part 4 by a sum of the time required for the movement in the arrow E direction and the time required for the settling of residual vibrations after the movement.

As shown in FIG. 18C, since the defect portion 113B is contained in the unmanageable region H for the defect portion 113A, the processing of the defect portion 113B is not performed immediately after the restoration of the defect portion 113A, but the restoration of the defect portion 113C that does not belong to the unmanageable region H is performed.

Then, as the returning movement of the arm part 4 goes, the restoration of the defect portion 113B that does not belong to an unmanageable region H is performed after the restoration of the defect portion 113C.

Although the movement operation as to one droplet ejecting section 6 has been described above, the apparatus has a plurality of droplet ejecting sections 6, which operate independently of one another.

Next, a procedure for restoring pixels of the defect portions 113 by the droplet ejecting section 6A that ejects a plurality of droplet materials shown in FIG. 7B is explained with reference to FIGS. 19A to 19C and FIGS. 20A to 20C.

Figure 19A:
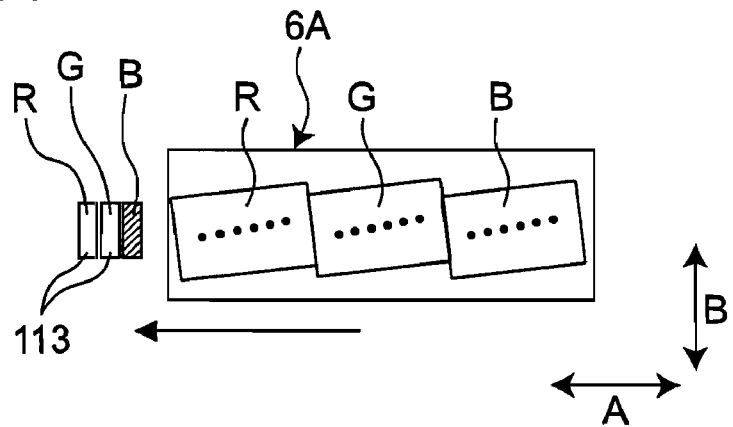
FIG. 19A is a function explanatory view showing recovery of a defect portion under a condition that a pixel longitudinal direction of a defect portion is perpendicular to an arm part moving direction.
Figure 19B:
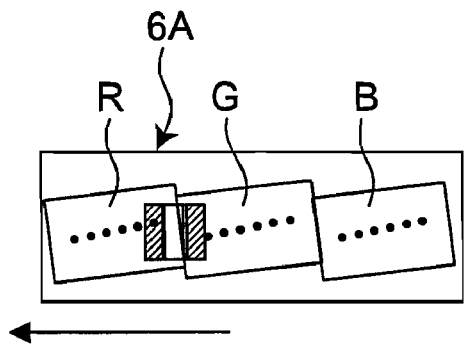
FIG. 19B is a function explanatory view showing recovery of a defect portion under a condition that a pixel longitudinal direction of a defect portion is perpendicular to the arm part moving direction.
Figure 19C:
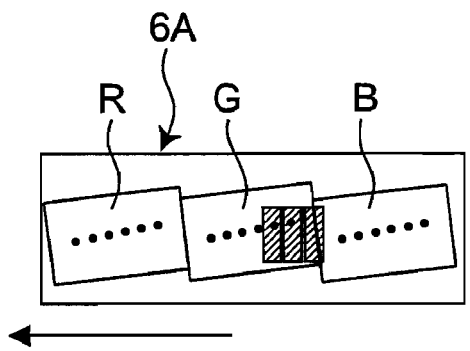
FIG. 19C is a function explanatory view showing recovery of a defect portion under a condition that a pixel longitudinal direction of a defect portion is perpendicular to the arm part moving direction.

First, restoration of a defect portion 113 is described on a case where, as shown in FIGS. 19A to 19C, a pixel longitudinal direction of the defect portion 113 is a direction perpendicular to the moving direction of the arm part 4.

As shown in FIG. 19A, in the event of occurrence of pixels showing no desired color due to color mixing of R and G pixels caused by dust or the like during the manufacturing process, the resulting portion is removed by laser in a rectangular shape, so that a recess portion, which is the defect portion 113, is formed. Then, the droplet ejecting section 6A is moved in one way of the arrow A direction.

Thereafter, as shown in FIG. 19B, a droplet is dropped to a defect portion 113 of the R pixel by the droplet ejecting section 6A. Further, as shown in FIG. 19C, a droplet is dropped to a defect portion 113 of the G pixel by the droplet ejecting section 6A.

Figure 20A:
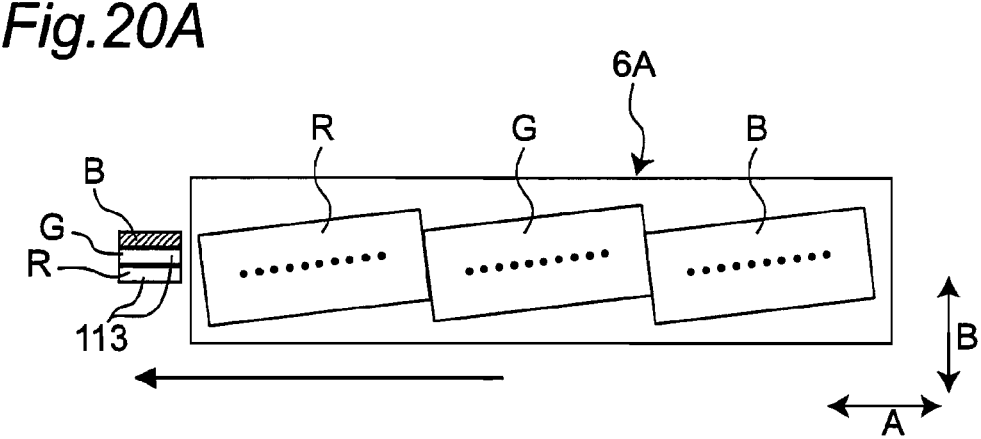
FIG. 20A is a function explanatory view showing recovery of a defect portion under a condition that a pixel longitudinal direction of a defect portion is the arm part moving direction.
Figure 20B:
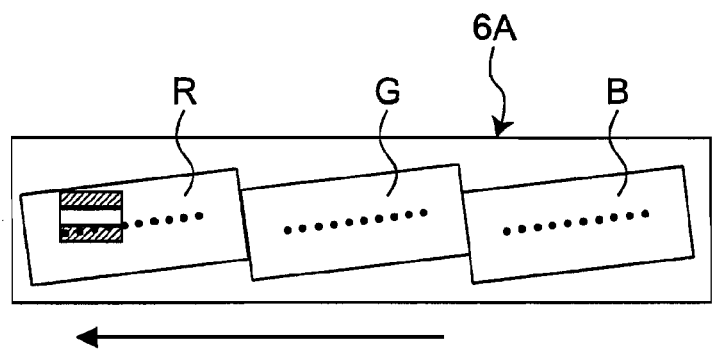
FIG. 20B is a function explanatory view showing recovery of a defect portion under a condition that a pixel longitudinal direction of a defect portion is the arm part moving direction.
Figure 20C:
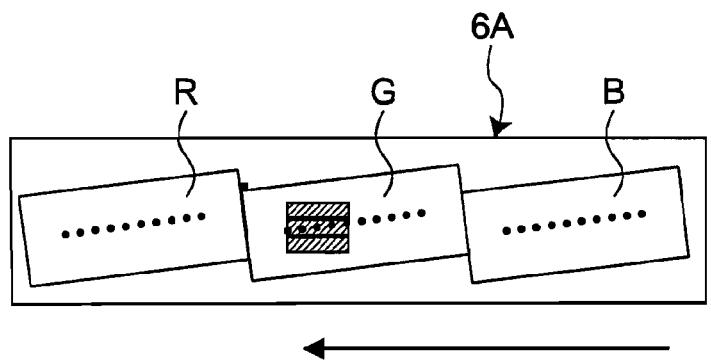
FIG. 20C is a function explanatory view showing recovery of a defect portion under a condition that a pixel longitudinal direction of a defect portion is the arm part moving direction.

Next, restoration of the defect portion 113 is described on a case where, as shown in FIGS. 20A to 20C, a pixel longitudinal direction of the defect portion 113 is the moving direction of the arm part 4.

As shown in FIG. 20A, in the event of occurrence of pixels showing no desired color due to color mixing of R and G pixels caused by dust or the like during the manufacturing process, the resulting portion is removed by laser in a rectangular shape, so that a recess portion, which is the defect portion 113, is formed. Then, the droplet ejecting section 6A is moved in one way of the arrow A direction.

Thereafter, as shown in FIG. 20B, a droplet is dropped to a defect portion 113 of the R pixel by the droplet ejecting section 6A. Further, as shown in FIG. 20C, a droplet is dropped to a defect portion 113 of the G pixel by the droplet ejecting section 6A.

Next, the method for measuring the distance 'd' between the ejecting surface 60 of each droplet ejecting section 6 and the top face of the substrate 10 (hereinafter, referred to as gap of the droplet ejecting section 6), as well as the method for adjusting the distance 'd' between the ejecting surface 60 of the droplet ejecting section 6 and the top face of the substrate 10, are explained with reference to FIGS. 6A, 21A and 21B. Although the distance 'd' between the ejecting surface 60 of the droplet ejecting section 6 and the top face of the substrate 10 is determined in this case, determination of the gap between the ejecting surface 60 of the droplet ejecting section 6 and the mounting surface 11a can be explained in a similar manner, as shown below, only by replacing the top face of the substrate 10 with the mounting surface 11a.

The adjustment of the gap of each droplet ejecting section 6 is performed, for example, after replacement of the droplet ejecting section 6. Here is explained a method for replacing the droplet ejecting section 6.

The arm part 4 is moved to a replacement position for the droplet ejecting section 6. This replacement position is desirably an endmost position of the apparatus in terms of workability, being set in this embodiment at an end on one side on which the distance measuring section 14 is provided. Moreover, desirably, an open space is provided below the droplet ejecting section 6 set in the replacement position. In this embodiment, enough open space is provided below the droplet ejecting section 6 set in the replacement position so that the ejecting surface 60 of the droplet ejecting section 6 is unlikely to be contaminated by the replacement work of the droplet ejecting section 6.

Thereafter, the old droplet ejecting section 6 is removed, and a new droplet ejecting section 6 is fitted in place. Since the gap of the just fitted droplet ejecting section 6 is unknown, the height of the ejecting surface 60 is adjusted by the adjustment member 17 so that the ejecting surface 60 becomes most away from the substrate 10 surface (mounting surface 11a).

Subsequently, the gap of the droplet ejecting section 6 is measured.

Figure 21A:
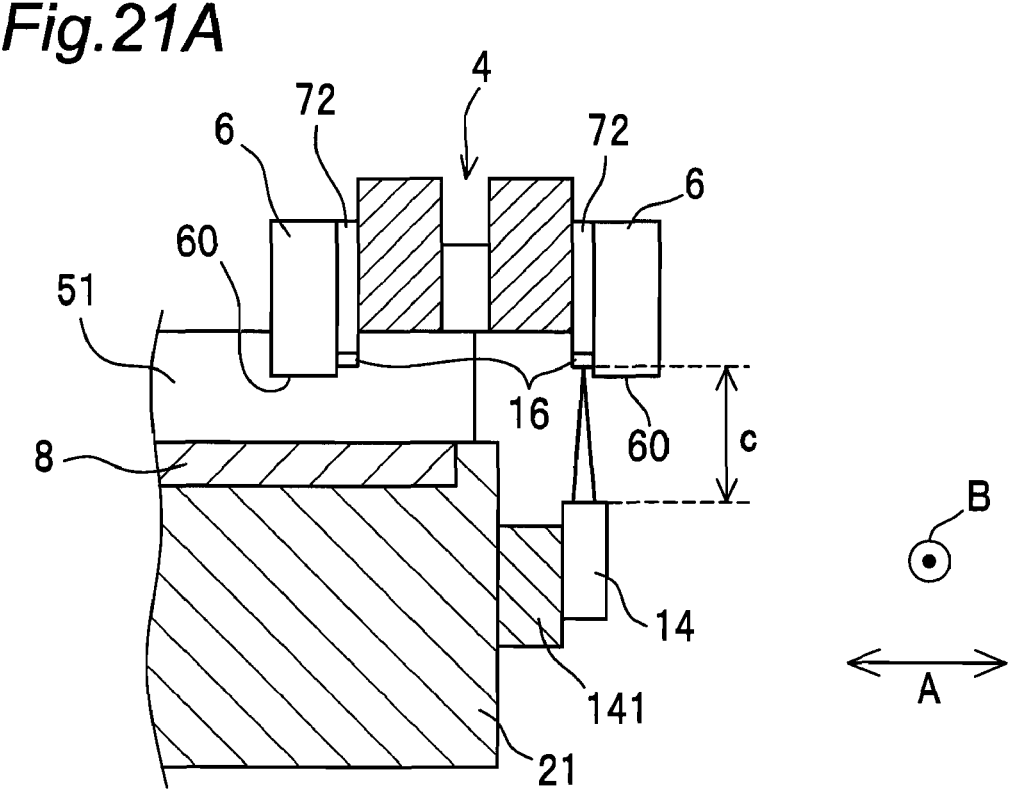
FIG. 21A is a function explanatory view for explaining measurement of a distance between a distance measuring section and a reference member.

First, as shown in FIG. 21A, the droplet ejecting section 6, the distance measuring section 14 and the arm part 4 are moved so that the distance measuring section 14 is positioned under the reference member 16 of the base plate 72 to which the droplet ejecting section 6 to be measured is fitted. Then, a distance from the distance measuring section 14 to the reference member 16 is measured by the distance measuring section 14. The resulting measured value is assumed as 'c'. In this embodiment, the value of 'c' was 80.24 mm.

Figure 21B:
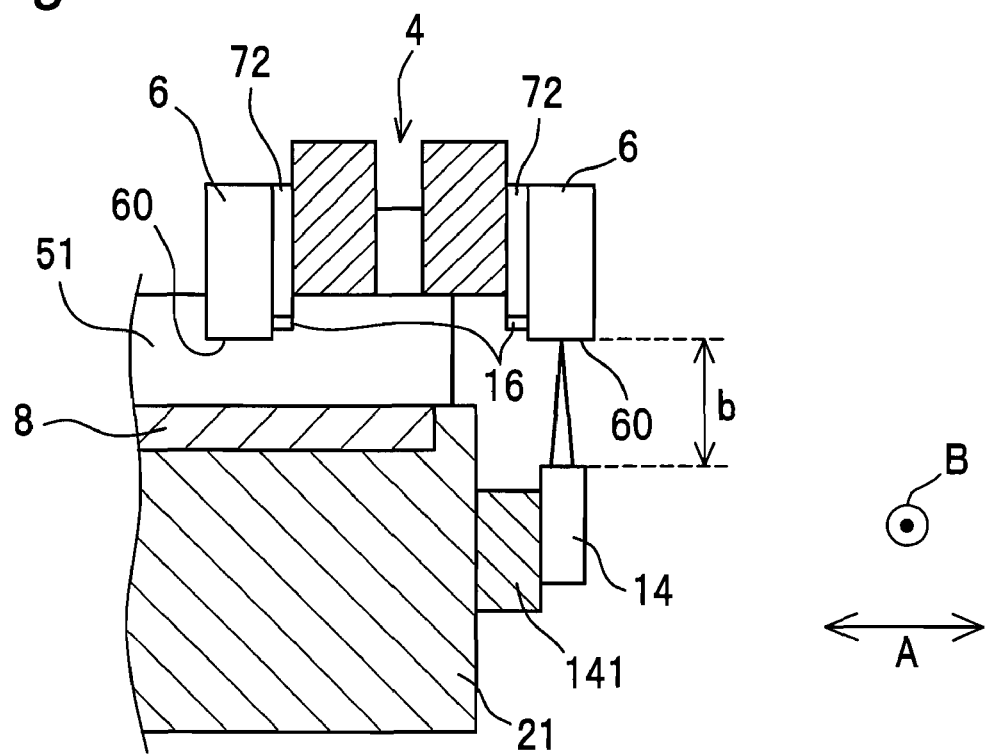
FIG. 21B is a function explanatory view for explaining measurement of a distance between the distance measuring section and an ejecting surface.

Thereafter, as shown in FIG. 21B, the arm part 4 is moved so that the distance measuring section 14 is positioned under the ejecting surface 60 of the droplet ejecting section 6 to be measured. In this case, because of quite high height precision of the arm part moving mechanism 5, the height of the ejecting surface 60 is hardly changed by the movement of the arm part 4. In this embodiment, the move distance of the arm part 4 is about 50 mm, where the resulting height variation of the ejecting surface 60 is less than 0.2 μm.

Then, the distance from the distance measuring section 14 to the ejecting surface 60 is measured by the distance measuring section 14. The resulting measured value is assumed as 'b'. In this embodiment, the value of 'b' was 72.15 mm.

Thereafter, the distance 'd' between the top face of the substrate 10 and the ejecting surface 60 of the droplet ejecting section 6 is determined by the calculation section 15 (shown in FIG. 1B). This is done by an equation that [d=a−(c−b)].

In this embodiment, the apparatus is so set up preliminarily that 'a' becomes 10.00 mm. Hence, 'd' resulted in 1.91 mm (=10.00−(80.24−72.15)).

Subsequently, the gap of the droplet ejecting section 6 is adjusted. That is, the height of the ejecting surface 60 is adjusted by the adjustment member 17 (shown in FIG. 6B) so that the distance 'd' calculated by the calculation section 15 becomes a specified quantity.

Since the specified quantity of distance 'd' is 0.50 mm in this embodiment, the height of the ejecting surface 60 was decreased by 1.41 mm (=1.91−0.50).

Again, as shown in FIG. 21B, the distance from the distance measuring section 14 to the ejecting surface 60 is measured by the distance measuring section 14 to determine the distance 'd' once more.

In this embodiment, the distance 'b' from the distance measuring section 14 to the ejecting surface 60 in the second-time measurement was 70.74 mm, and the distance 'd' was 0.50 mm (=10.00−(80.24−70.74)).

Iterating this adjustment of distance 'd' resulted in a value of distance 'd' equal to 0.50±0.01 mm.

In this embodiment, an adjustment quantity for the height of the droplet ejecting section 6 is first determined, and then the height of the droplet ejecting section 6 is adjusted, after which the height of the droplet ejecting section 6 is measured once again. However, it is also possible to iteratively measure the height of the droplet ejecting section 6 to thereby gradually change the height of the droplet ejecting section 6 so that the distance 'd' becomes the specified quantity. In this case, the iterative measurement of the height of the droplet ejecting section 6 accelerates the detection of occurrence of abnormal changes in the height.

Also in this embodiment, the measurement of the height of the reference member 16 is necessarily involved in the adjustment of the distance 'd'. However, it is also allowable to measure the height of the reference member 16 only for the first-time adjustment of the distance 'd' and use the first-time measured height of the reference member 16 for the second and following adjustments of the distance 'd'. That is, since the position of the reference member 16 and the position of the distance measuring section 14 are determinate for each of the droplet ejecting sections 6, the distance from the distance measuring section 14 to the reference member 16 is equal in value among the individual droplet ejecting sections 6. In this case, the measurement of the height of the reference member 16 can be omitted for the second-time and following adjustments of distance 'd', so that the adjustment time for distance 'd' can be shortened.

Figure 22A:
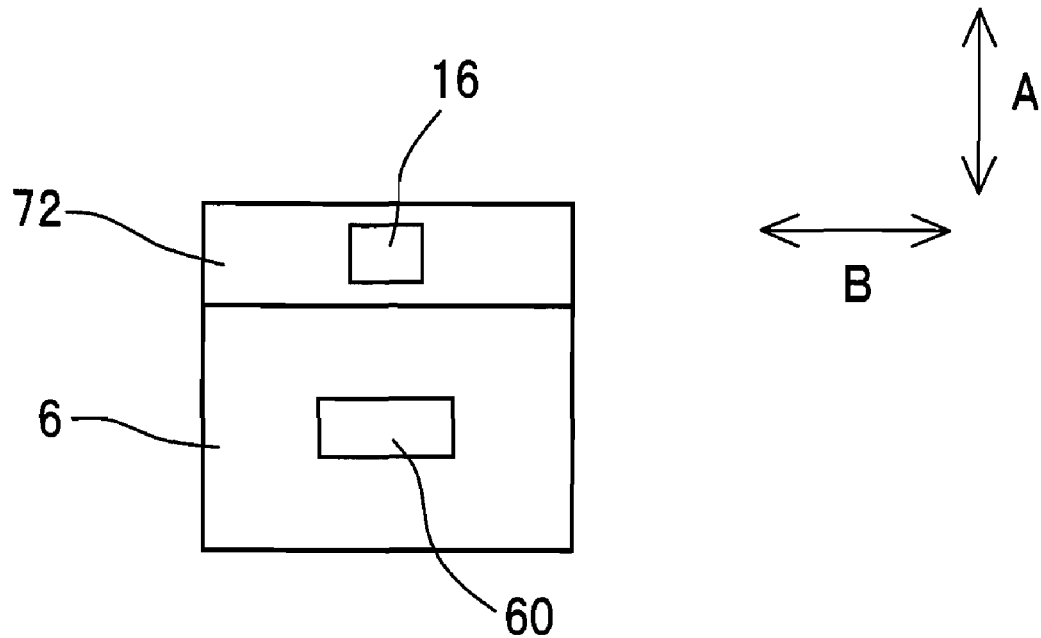
FIG. 22A is a bottom view of a droplet ejecting section and a base plate.

As shown in the bottom view of FIG. 22A, the reference member 16 and the ejecting surface 60 are of the same position in the arrow B direction. Accordingly, the distance measuring section 14 is enabled to measure the heights of the reference member 16 and the ejecting surface 60, respectively, only by moving the arm part 4 in the arrow A direction.

Figure 22B:
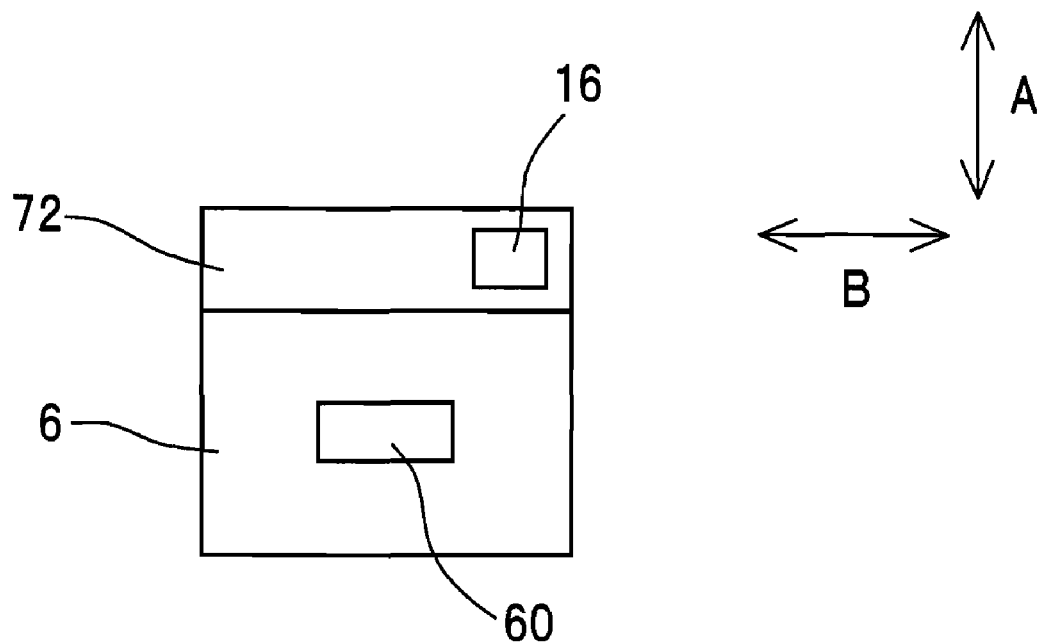
FIG. 22B is a bottom view of another droplet ejecting section and a base plate.

In addition, as shown in FIG. 22B, the reference member 16 and the ejecting surface 60 may be set at different positions in the arrow B direction. In this case, not only moving the arm part 4 in the arrow A direction but also moving the distance measuring section 14 in the arrow B direction are necessitated to measure the respective heights of the reference member 16 and the ejecting surface 60.

However, since the reference member 16 is provided for each of the droplet ejecting sections 6, the distance between the reference member 16 and the ejecting surface 60 in the arrow B direction is short. Because of this, movement of the distance measuring section 14 in the arrow B direction causes only small changes in the heights of the reference member 16 and the ejecting surface 60. In this embodiment, the distance between the reference member 16 and the ejecting surface 60 in the arrow B direction was about 20 mm, and their height changes was about 4 μm. Then, iteratively adjusting the distance 'd' resulted in a value of the distance 'd' equal to 0.50±0.01 mm.

According to the droplet applying apparatus of the above-described construction, the droplet applying apparatus includes the reference members 16, each of which is provided at a site of the beam members 41, 42 proximate to the ejecting surface 60 of one of the droplet ejecting sections 6 and whose distance to the mounting surface 11a is known, the distance measuring section 14, which measures the distance to the ejecting surface 60 of the droplet ejecting section 6 as well as the distance to the reference member 16, and the calculation section 15, which, based on a distance between the ejecting surface 60 of the one droplet ejecting section 6 and the distance measuring section 14 as well as a distance between the one reference member 16 and the distance measuring section 14, both measured by the distance measuring section 14, plus a known distance between the one reference member 16 and the mounting surface 11a, calculates a gap between the ejecting surface 60 of the one droplet ejecting section 6 and the mounting surface 11a. Therefore, the gap between the ejecting surface 60 of the one droplet ejecting section 6 and the mounting surface 11a can be calculated regardless of the position of the mounting surface 11a. Then, the gap of the droplet ejecting section 6 (i.e., distance 'd' between the ejecting surface 60 of the droplet ejecting section 6 and the surface of the substrate 10) can be determined from the gap between the ejecting surface 60 of the droplet ejecting section 6 and the mounting surface 11a as well as the thickness of the substrate 10. Since the thickness of the substrate 10 is known, once determining the gap between the ejecting surface 60 of the droplet ejecting section 6 and the mounting surface 11a allows the gap of the droplet ejecting section 6 to be determined.

Accordingly, the gap between the ejecting surface 60 of the droplet ejecting section 6 and the mounting surface 11a can be determined without moving the mounting surface, as would be involved in the conventional technique, so that the replacement time for the droplet ejecting section 6 can be shortened. Also, since the droplet ejecting section 6 does not overlap with the mounting surface 11a in the adjustment of the gap between the ejecting surface 60 of the droplet ejecting section 6 and the mounting surface 11a, contact between the droplet ejecting section 6 and the mounting surface 11a can be prevented, so that the height of the ejecting surface 60 of the droplet ejecting section 6 can be adjusted with safety. Moreover, even with the mounting surface 11a fixed (i.e., stationary stage), the height of the ejecting surface 60 of the droplet ejecting section 6 can be adjusted, so that the apparatus can be made smaller-sized and lower-priced.

Also, the droplet applying apparatus includes the beam members 41, 42 that are movable relative to the base 11, and a plurality of droplet ejecting sections 6 movably fitted to the beam members 41, 42. Therefore, it becomes possible, in the application of droplets to specified portions (e.g., coloring failure portions) of the substrate 10 by the droplet ejecting sections 6, to execute the droplet ejection by moving the beam members 41, 42 or the droplet ejecting sections 6, so that the droplets can be applied to the specified portions of the substrate 10 with high efficiency.

Also, the quantity of the droplet ejecting sections 6 can be reduced to a necessary minimum, so that the quantity of non-operating droplet ejecting sections 6 can be cut down. Accordingly, clogging of the droplet ejecting sections 6 by droplets can be prevented, the liquid quantity of waste fluid due to the maintenance operation of the droplet ejecting sections 6 can be reduced, and moreover the ejection quantity of all the droplet ejecting sections 6 can be uniformized.

The droplet applying apparatus also includes the adjustment member 17 that makes the ejecting surface 60 of each droplet ejecting section 6 closer to or farther from the mounting surface 11a to thereby adjust the gap between the ejecting surface 60 of the droplet ejecting section 6 and the mounting surface 11a. Therefore, the gap between the ejecting surface 60 of each droplet ejecting section 6 and the mounting surface 11a can be adjusted with reliability.

The distance measuring section 14 does not overlap with the mounting surface 11a, and is positioned on one side of the mounting surface 11a opposite to the side on which the beam members 41, 42 and the droplet ejecting sections 6 are provided. Therefore, the distance measuring section 14 can be set in a wide space, not in a narrow space between the mounting surface 11a, the beam members 41, 42 and the droplet ejecting sections 6. Thus, the distance measuring section 14 can be set up easily without problem.

The reference members 16 are provided on the slide mechanisms 7. Therefore, the distance between the ejecting surface 60 of each droplet ejecting section 6 and the reference member 16 can be shortened, making it possible to reduce relative errors of the distance between the ejecting surface 60 of each droplet ejecting section 6 and the distance measuring section 14 as well as the distance between the reference member 16 and the distance measuring section 14. Thus, the gap between the ejecting surface 60 of the droplet ejecting section 6 and the mounting surface 11a can be correctly calculated.

According to the method for measuring gaps of droplet ejecting sections as described above, the method includes the step of measuring a distance to the ejecting surface 60 of one of the droplet ejecting sections 6 by the distance measuring section 14, the step of measuring a distance to one of the reference members 16 by the distance measuring section 14, and the step of, based on the distance between the ejecting surface 60 of the one droplet ejecting section 6 and the distance measuring section 14 as well as the distance between the one reference member 16 and the distance measuring section 14, both measured by the distance measuring section 14, plus the known distance between the one reference member 16 and the mounting surface 11a, calculating a gap between the ejecting surface 60 of the droplet ejecting section 6 and the mounting surface 11a by the calculation section 15. Therefore, the gap between the ejecting surface 60 of the one droplet ejecting section 6 and the mounting surface 11a can be calculated regardless of the position of the mounting surface 11a. Then, the gap of the droplet ejecting section 6 (i.e., distance 'd' between the ejecting surface 60 of the droplet ejecting section 6 and the surface of the substrate 10) can be determined from the gap between the ejecting surface 60 of the droplet ejecting section 6 and the mounting surface 11a as well as the thickness of the substrate 10. Since the thickness of the substrate 10 is known, once determining the gap between the ejecting surface 60 of the droplet ejecting section 6 and the mounting surface 11a allows the gap of the droplet ejecting section 6 to be determined.

Accordingly, the gap between the ejecting surface 60 of the droplet ejecting section 6 and the mounting surface 11a can be determined without moving the mounting surface, as would be involved in the conventional technique, so that the replacement time for the droplet ejecting section 6 can be shortened. Also, since the droplet ejecting section 6 does not overlap with the mounting surface 11a in the adjustment of the gap between the ejecting surface 60 of the droplet ejecting section 6 and the mounting surface 11a, contact between the droplet ejecting section 6 and the mounting surface 11a can be prevented, so that the height of the ejecting surface 60 of the droplet ejecting section 6 can be adjusted with safety. Moreover, even with the mounting surface 11a fixed (i.e., stationary stage), the height of the ejecting surface 60 of the droplet ejecting section 6 can be adjusted, so that the apparatus can be made smaller-sized and lower-priced.

According to the method for adjusting gaps of droplet ejecting sections as described above, the method includes the step of measuring a distance to the ejecting surface 60 of one of the droplet ejecting sections 6 by the distance measuring section 14, the step of measuring a distance to one of the reference members 16 by the distance measuring section 14, the step of, based on the distance between the ejecting surface 60 of the one droplet ejecting section 6 and the distance measuring section 14 as well as the distance between the one reference member 16 and the distance measuring section 14, both measured by the distance measuring section 14, plus the known distance between the one reference member 16 and the mounting surface 11a, calculating a gap between the ejecting surface 60 of the one droplet ejecting section 6 and the mounting surface 11a by the calculation section 15, and the step of moving the ejecting surface 60 of the one droplet ejecting section 6 closer to or farther from the mounting surface 11a so that the gap between the ejecting surface 60 of the one droplet ejecting section 6 and the mounting surface 11a calculated by the calculation section 15 becomes a specified quantity. Therefore, the gap between the ejecting surface 60 of the one droplet ejecting section 6 and the mounting surface 11a can be calculated regardless of the position of the mounting surface 11a. Then, the gap of the droplet ejecting section 6 (i.e., distance 'd' between the ejecting surface 60 of the droplet ejecting section 6 and the surface of the substrate 10) can be determined from the gap between the ejecting surface 60 of the droplet ejecting section 6 and the mounting surface 11a as well as the thickness of the substrate 10. Since the thickness of the substrate 10 is known, once determining the gap between the ejecting surface 60 of the droplet ejecting section 6 and the mounting surface 11a allows the gap of the droplet ejecting section 6 to be determined.

Accordingly, the gap between the ejecting surface 60 of the droplet ejecting section 6 and the mounting surface 11a can be determined without moving the mounting surface, as would be involved in the conventional technique, so that the replacement time for the droplet ejecting section 6 can be shortened. Also, since the droplet ejecting section 6 does not overlap with the mounting surface 11a in the adjustment of the gap between the ejecting surface 60 of the droplet ejecting section 6 and the mounting surface 11a, contact between the droplet ejecting section 6 and the mounting surface 11a can be prevented, so that the height of the ejecting surface 60 of the droplet ejecting section 6 can be adjusted with safety. Moreover, even with the mounting surface 11a fixed (i.e., stationary stage), the height of the ejecting surface 60 of the droplet ejecting section 6 can be adjusted, so that the apparatus can be made smaller-sized and lower-priced.

The present invention is not limited to the above-described embodiment. For example, the reference members 16 may be provided on the beam member bodies 410, 420, as an example, other than on the slide mechanisms 7. Also, the distance measuring section 14 may be fitted to the base 11 so as to be movable in the arrow A direction relative to the mounting surface 11a. Further, the distance measuring section 14 does not need to be moved in the same direction as the beam members 41, 42 extend (in the arrow B direction), and may be moved in any way only if the confrontation with the ejecting surfaces 60 of every droplet ejecting section 6 is ensured by the movement of the distance measuring section 14.

Also, the adjustment member 17 may be so arranged as to, other than move part of the droplet ejecting sections 6, move all the droplet ejecting sections 6, as an example, so that the gap between the ejecting surface 60 and the mounting surface 11a is adjusted.

The image pickup devices may be those other than the image pickup parts 90 or the observation camera 91. The image pickup parts 90 may be provided by one camera unit in which the high-magnification mode and the low-magnification mode are switched over by zooming. The image pickup parts 90 may be so designed that observations by high and low magnifying powers can be implemented at the same time by means of optical path division. More specifically, light from the substrate 10 may be split so as to be led to two CCDs having different pixel counts, respectively.

The moving direction of the droplet ejecting sections 6 and the moving direction of the arm part 4 may be other than perpendicular to each other, as viewed in a plane. It is also allowed that the slide mechanisms 7 are enabled to move the droplet ejecting sections 6 in a direction different from the arrow B direction. The droplet ejecting sections 6 may be not movable relative to the base 11, but positioned to the beam members 41, 42. It is also allowable that the arm part 4 is stationary while the mounting stage 3 is movable.

Further, the beam members may be provided one in quantity, and the droplet ejecting sections 6 may be fitted to both side faces of the beam member. Also, the number of the beam members may be freely increased or decreased.

The droplet ejecting sections 6 may also be arranged to eject and apply droplets to the entire surface of the substrate 10. Also, the number of the droplet ejecting sections 6 may be freely increased or decreased.

The droplet applying apparatus of the invention is applied to apparatuses that perform restoration of defect portions of a color filter substrate hereinabove. However, the droplet applying apparatus may also be applied to other apparatuses that perform ejection to desired points scattered on the substrate. For example, the invention apparatus is also applicable to apparatuses that eject electrically conductive ink onto the substrate to draw interconnect patterns, apparatuses that eject materials for formation of organic EL (Electronic Luminescence) on the substrate to manufacture organic EL displays, apparatuses that restore defect portions of organic EL displays, apparatuses that print images on large-size signboards or the like, apparatuses that restore images, or other manufacturing apparatuses to which the ink jet technology is applied.

The invention claimed is:

1. A droplet applying apparatus comprising:
a base having a mounting surface on which a substrate is to be mounted;
a beam member which confronts the mounting surface and extends in one direction of the mounting surface and which is fitted to the base so as to be movable relative to the base in another direction of the mounting surface;

a plurality of droplet ejecting sections which are removably fitted to the beam member and which eject and apply droplets from ejecting surfaces thereof to the substrate;

reference members each of which is provided at a site of the beam member proximate to the ejecting surface of each droplet ejecting section and whose distance to the mounting surface is known;

a distance measuring section which is fitted to the base so as to be movable relative to the beam member and which confronts the ejecting surface of each droplet ejecting section to measure a distance to the ejecting surface of the droplet ejecting section and moreover which confronts each reference member to measure a distance to the reference member; and a calculation section for, based on a distance between the ejecting surface of one of the droplet ejecting sections and the distance measuring section as well as a distance between one of the reference members proximate to the ejecting surface of the one droplet ejecting section and the distance measuring section, both measured by the distance measuring section, plus a known distance between the one reference member and the mounting surface, calculating a gap between the ejecting surface of the one droplet ejecting section and the mounting surface.

2. The droplet applying apparatus as claimed in claim 1, further comprising an adjustment member for moving the ejecting surface of each of the droplet ejecting sections closer to or farther from the mounting surface to adjust a gap between the ejecting surface of the droplet ejecting section and the mounting surface.

3. The droplet applying apparatus as claimed in claim 1, wherein the distance measuring section does not overlap with the mounting surface and is positioned on one side of opposite to a side of the mounting surface on which the beam member and the droplet ejecting sections are provided.

4. The droplet applying apparatus as claimed in claim 1, wherein the beam member comprises:

a beam member body; and slide mechanisms which are fitted to the beam member body and to which the droplet ejecting sections are fitted, respectively, so as to be movable relative to the beam member body, wherein the reference members are provided on the slide mechanisms, respectively.

5. A method for measuring a gap between an ejecting surface of each of droplet ejecting sections and a mounting surface in a droplet applying apparatus, wherein the droplet applying apparatus comprises:

a base having the mounting surface on which a substrate is to be mounted;

a beam member which confronts the mounting surface and extends in one direction of the mounting surface and which is fitted to the base so as to be movable relative to the base in another direction of the mounting surface; and a plurality of the droplet ejecting sections which are removably fitted to the beam member and which eject and apply droplets from ejecting surfaces thereof to the substrate, the method comprising the steps of:

setting a distance measuring section, which is fitted to the base so as to be movable relative to the beam member, opposed to an ejecting surface of one of the droplet ejecting sections to measure a distance to the ejecting surface of the one droplet ejecting section;

setting the distance measuring section opposed to one reference member proximate to the ejecting surface of the one droplet ejecting section out of reference members each of which is provided at a site of the beam member proximate to the ejecting surface of the droplet ejecting section and whose distance to the mounting surface is known, to measure a distance to the one reference member;

based on a distance between the ejecting surface of the one droplet ejecting section and the distance measuring section as well as a distance between the one reference member and the distance measuring section, both measured by the distance measuring section, plus a known distance between the one reference member and the mounting surface, calculating a gap between the ejecting surface of the one droplet ejecting section and the mounting surface by a calculation section.

6. A method for adjusting a gap between an ejecting surface of each of droplet ejecting sections and a mounting surface in a droplet applying apparatus, wherein the droplet applying apparatus comprises:

a base having the mounting surface on which a substrate is to be mounted;

a beam member which confronts the mounting surface and extends in one direction of the mounting surface and which is fitted to the base so as to be movable relative to the base in another direction of the mounting surface; and a plurality of the droplet ejecting sections which are removably fitted to the beam member and which eject and apply droplets from ejecting surfaces thereof to the substrate, the method comprising the steps of:

setting a distance measuring section, which is fitted to the base so as to be movable relative to the beam member, opposed to an ejecting surface of one of the droplet ejecting sections to measure a distance to the ejecting surface of the one droplet ejecting section;

setting the distance measuring section opposed to one reference member proximate to the ejecting surface of the one droplet ejecting section out of reference members each of which is provided at a site of the beam member proximate to the ejecting surface of the droplet ejecting section and whose distance to the mounting surface is known, to measure a distance to the one reference member;

based on a distance between the ejecting surface of the one droplet ejecting section and the distance measuring section as well as a distance between the one reference member and the distance measuring section, both measured by the distance measuring section, plus a known distance between the one reference member and the mounting surface, calculating a gap between the ejecting surface of the one droplet ejecting section and the mounting surface by a calculation section; and moving the ejecting surface of the one droplet ejecting section closer to or farther from the mounting surface so that the gap between the ejecting surface of the one droplet ejecting section and the mounting surface calculated by the calculation section becomes a specified quantity.

* * * * *